US011920486B2

(12) United States Patent
Iida et al.

(10) Patent No.: US 11,920,486 B2
(45) Date of Patent: Mar. 5, 2024

(54) HIGH-TEMPERATURE COMPONENT AND METHOD OF PRODUCING THE HIGH-TEMPERATURE COMPONENT

(71) Applicant: Mitsubishi Power, Ltd., Kanagawa (JP)

(72) Inventors: Koichiro Iida, Tokyo (JP); Yoshinori Wakita, Tokyo (JP); Taro Tokutake, Tokyo (JP); Shuji Tanigawa, Tokyo (JP); Ryuta Ito, Tokyo (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 195 days.

(21) Appl. No.: 17/437,549

(22) PCT Filed: Feb. 19, 2020

(86) PCT No.: PCT/JP2020/006544
§ 371 (c)(1),
(2) Date: Sep. 9, 2021

(87) PCT Pub. No.: WO2020/202866
PCT Pub. Date: Oct. 8, 2020

(65) Prior Publication Data
US 2022/0162962 A1    May 26, 2022

(30) Foreign Application Priority Data
Mar. 29, 2019  (JP) .................................. 2019-065821

(51) Int. Cl.
*F01D 25/12* (2006.01)
*B22F 5/00* (2006.01)
(Continued)

(52) U.S. Cl.
CPC .............. *F01D 25/12* (2013.01); *B22F 5/009* (2013.01); *B22F 10/28* (2021.01); *F01D 25/14* (2013.01);
(Continued)

(58) Field of Classification Search
CPC .......... F01D 11/08; F01D 25/12; F01D 11/24; F01D 9/04; F01D 25/14; F01D 5/187;
(Continued)

(56) References Cited

U.S. PATENT DOCUMENTS 5,624,231 A    4/1997  Ohtomo et al.
8,099,961 B2*  1/2012  Gerendas .............. F23R 3/007
                                                60/757
(Continued)

FOREIGN PATENT DOCUMENTS

CN    103925015    7/2014
CN    105019950    11/2015
(Continued)

OTHER PUBLICATIONS

Machine Translation of JP 2012202335 [retrieved on May 18, 2023]. Retrieved from: Espacenet. (Year: 2023).*
(Continued)

*Primary Examiner* — Eric J Zamora Alvarez
(74) *Attorney, Agent, or Firm* — Wenderoth, Lind & Ponack, L.L.P.

(57) ABSTRACT

A high-temperature component according to an embodiment is a high-temperature component which requires to be cooled by a cooling medium, and includes: a plurality of cooling passages through which the cooling medium is able to flow; and a first partition wall disposed inside each of the cooling passages to partition the cooling passage into a plurality of first branch flow passages. The first partition wall includes an oblique portion formed such that, in an upstream side region of the first partition wall, a flow-passage cross-sectional area of the cooling passage as seen in an extension direction of the cooling passage gradually decreases from an upstream side toward a downstream side.

15 Claims, 14 Drawing Sheets

(51) Int. Cl.
  *B22F 10/28* (2021.01)
  *B33Y 10/00* (2015.01)
  *B33Y 80/00* (2015.01)
  *F01D 25/14* (2006.01)

(52) U.S. Cl.
  CPC ......... *B33Y 80/00* (2014.12); *F05D 2260/204* (2013.01); *F05D 2260/2214* (2013.01)

(58) Field of Classification Search
  CPC .......... F01D 5/225; F01D 9/041; F01D 9/065; F01D 11/005; F01D 9/023; F01D 5/186; F01D 5/188; F01D 9/06; F05D 2240/11; F05D 2260/20; F05D 2260/202; F05D 2260/201; F05D 2260/204; F05D 2220/32; F05D 2240/81; F05D 2260/2214; F05D 2260/22141; Y02P 10/25; B22F 5/009; B22F 10/28; B22F 3/105; B22F 3/16; B33Y 80/00; B33Y 10/00; F02C 7/141; F02C 7/18; F02K 9/40; F02K 9/64
  See application file for complete search history.

(56) References Cited

U.S. PATENT DOCUMENTS

| | | | | |
|---|---|---|---|---|
| 9,416,662 | B2* | 8/2016 | Morgan | ............... F01D 5/081 |
| 2005/0069414 | A1 | 3/2005 | Liang | |
| 2011/0044805 | A1 | 2/2011 | Koyabu et al. | |
| 2012/0057960 | A1 | 3/2012 | Berrong et al. | |
| 2014/0099476 | A1 | 4/2014 | Subramanian et al. | |
| 2015/0059357 | A1 | 3/2015 | Morgan et al. | |
| 2016/0061113 | A1* | 3/2016 | Romanov | ............... B22C 9/10 |
| | | | | 60/806 |
| 2016/0175934 | A1 | 6/2016 | Lacy et al. | |
| 2017/0051623 | A1 | 2/2017 | Romanov et al. | |
| 2017/0101932 | A1 | 4/2017 | Stover et al. | |
| 2017/0175547 | A1 | 6/2017 | Smith et al. | |
| 2017/0306766 | A1 | 10/2017 | Münzer | |
| 2018/0320595 | A1* | 11/2018 | Sato | ............... F23R 3/06 |
| 2019/0368377 | A1* | 12/2019 | VanTassel | ............... F01D 11/10 |

FOREIGN PATENT DOCUMENTS

| | | |
|---|---|---|
| JP | 62-10402 | 1/1987 |
| JP | 7-189602 | 7/1995 |
| JP | 2012-202335 | 10/2012 |
| JP | 2015/48848 | 3/2015 |
| JP | 2016/502589 | 1/2016 |
| JP | 2016-117276 | 6/2016 |
| JP | 2017-116208 | 6/2017 |
| JP | 2017-122445 | 7/2017 |
| WO | 2014/107204 | 7/2014 |

OTHER PUBLICATIONS

International Search Report dated May 19, 2020 in corresponding International Application No. PCT/JP2020/006544, with English translation.

International Preliminary Report on Patentability dated Oct. 14, 2021 in corresponding International Application No. PCT/JP2020/006544, with English translation.

Office Action dated Dec. 27, 2022 in corresponding Japanese Patent Application No. 2019-065821, with English translation.

Office Action dated Mar. 10, 2021 in counterpart TW Application No. 109105648.

Office Action dated Apr. 14, 2023 in counterpart CN Application No. 202080015579.2.

* cited by examiner

A3 ARROW VIEW

A4-A4 ARROW CROSS-SECTIONAL VIEW

A5-A5 ARROW CROSS-SECTIONAL VIEW

UPSTREAM SIDE IN AXIAL DIRECTION ↔ Da ↔ DOWNSTREAM SIDE IN AXIAL DIRECTION

A12-A12 ARROW VIEW

HIGH-TEMPERATURE COMPONENT AND METHOD OF PRODUCING THE HIGH-TEMPERATURE COMPONENT

TECHNICAL FIELD

The present disclosure relates to a high-temperature component and a method of producing the high-temperature component.

BACKGROUND ART

For instance, in a machine inside which a high-temperature working gas flows, such as a gas turbine and a rocket turbine, components constituting the machine include high-temperature components that require cooling by a cooling medium. As a cooling structure of such a high-temperature component, it is known to cool a high-temperature component by letting cooling air flow through a plurality of feed channels (cooling passages) through which cooling air is able to flow inside the component (see Patent Document 1 for instance).

CITATION LIST

Patent Literature

Patent Document 1: JP2015-48848A

SUMMARY

Problems to be Solved

The cooling air (cooling medium) flowing through the cooling passage is heated by heat transmitted from the inner wall surface of the cooling passage, and the temperature of the cooling air increases toward the downstream side of the cooling passage. Thus, toward the downstream side of the cooling passage, the temperature difference between the inner wall surface and the cooling medium decreases and the amount of heat transmission decreases, which reduces the cooling capacity. Thus, when the flow amount of the cooling medium is increased, for instance, in order to prevent shortage of the cooling capacity at the downstream side of the cooling passage, the cooling capacity becomes excessive at the upstream side of the cooling passage.

In a machine that operates with a high-temperature working gas such as a gas turbine and a rocket engine, excessive cooling generally leads to deterioration of the heat efficiency of the machine. Thus, it is desired to suppress excessive cooling while preventing shortage of cooling capacity.

In view of the above, an object of at least one embodiment of the present invention is to provide a high-temperature component that can suppress excessive cooling while preventing shortage of cooling capacity.

Solution to the Problems (1) According to at least one embodiment of the present invention, a high-temperature component which requires to be cooled by a cooling medium includes: a plurality of cooling passages through which the cooling medium is able to flow; and a first partition wall disposed inside each of the cooling passages to partition the cooling passage into a plurality of first branch flow passages. The first partition wall includes an oblique portion formed such that, in an upstream side region of the first partition wall, a flow-passage cross-sectional area of the cooling passage as seen in an extension direction of the cooling passage gradually decreases from an upstream side toward a downstream side.

With the above configuration (1), by providing the first partition wall inside the cooling passage, it is possible to reduce the flow-passage cross-sectional area of the cooling passage as seen in the extension direction of the cooling passage. Accordingly, the flow velocity of the cooling medium flowing through the cooling passage becomes faster in the first branch passages being a section where the first partition wall is provided, than in a section at the upstream side of the first branch flow passages where the first partition wall is not provided. Thus, it is possible to have a greater coefficient of heat transfer to the cooling medium in the first branch flow passage, than in the section at the upstream side of the first branch flow passages.

Furthermore, by providing the first partition wall inside the cooling passage, the total area of the areas of the inner wall surfaces of the plurality of first branch flow passages per unit section of the plurality of first branch flow passages becomes greater than the area of the inner wall surface of the cooling passage per unit length in the section at the upstream side of the first branch flow passage.

Accordingly, it is possible to suppress excessive cooling in the section at the upstream side of the first branch flow passages, while preventing shortage of cooling capacity even when the temperature of the cooling medium increases toward the downstream side in the first branch flow passages.

When the flow-passage cross-sectional area of the cooling passage rapidly decreases from the upstream side toward the downstream side, from the section before (upstream side of) the rapid decrease of the flow-passage cross-sectional area toward the section after (downstream side of) the rapid decrease, a region may be created, where the coefficient of heat transfer to the cooling medium rapidly increases and the temperature of the high-temperature component rapidly decreases. Furthermore, when the area per unit length of the inner wall surface of the cooling passage rapidly increases from the upstream side toward the downstream side, from the section before (upstream side of) the rapid increase of the area of the inner wall surface toward the section after (downstream side of) the rapid increase, a region may be created, where the amount of heat transfer to the cooling medium rapidly increases and the temperature of the high-temperature component rapidly decreases.

When the temperature of a high-temperature component rapidly changes in a local region, the thermal stress increases, which may have a negative impact on the durability of the high-temperature component. Furthermore, the thermal efficiency may deteriorate due to excessive cooling.

In view of this, with the above configuration (1), in the section of the cooling passage where the oblique portion is formed, the flow-passage cross-sectional area of the cooling passage gradually decreases from the upstream side toward the downstream side. Accordingly, it is possible to suppress rapid decrease of the flow-passage cross-sectional area of the cooling passage from the upstream side toward the downstream side, and rapid increase of the area per unit length of the inner wall surface of the cooling passage from the upstream side toward the downstream side, and thereby suppress rapid increase of the coefficient and amount of heat transfer to the cooling medium as described above. Thus, it is possible to suppress generation of a region where the temperature of the high-temperature component rapidly decreases, and prevent deterioration of the durability of the high-temperature component. Furthermore, it is possible to suppress deterioration of the thermal efficiency due to excessive cooling.

(2) In some embodiments, in the above configuration (1), each of the cooling passages is divided into a pair of the first branch flow passages by the first partition wall in a width direction of the cooling passage, and each of the first branch flow passages is formed such that, in an upstream end region of the first branch flow passage adjacent to the oblique portion of the first partition wall in the width direction, a dimension Hp in a height direction of the cooling passage orthogonal to the width direction gradually increases toward the downstream side.

With the above configuration (2), it is possible to gradually increase the flow-passage cross-sectional area in the upstream end region of the first branch flow passage. Thus, it is possible to suppress reduction of the flow-passage cross-sectional area due to provision of the first partition wall, and thus it is possible to suppress rapid increase of the coefficient of heat transfer to the cooling medium as described above.

(3) In some embodiments, in the above configuration (1) or (2), each of the cooling passages is divided into a pair of the first branch flow passages by the first partition wall in a width direction of the cooling passage, and each of the first branch flow passages includes, at least at a downstream side of the oblique portion, a flow-passage height reduction portion where a dimension Hp in a height direction of the cooling passage orthogonal to the width direction gradually decreases toward the downstream side.

With the above configuration (3), it is possible to gradually decrease the flow-passage cross-sectional area in the flow-passage height reduction portion. Accordingly, it is possible to gradually increase the flow velocity, that is, heat transfer coefficient, of the cooling medium at the flow-passage height reduction portion, and thus it is possible to prevent shortage of cooling capacity even when the temperature of the cooling medium increases toward the downstream side at the flow-passage height reduction portions.

(4) In some embodiments, in the above configuration (3), the flow-passage height reduction portion and the oblique portion overlap with one another at least partially in the extension direction of the cooling passage.

With the above configuration (4), in the section where the flow-passage height reduction portion and the oblique portion overlap with one another, compared to a section where the flow-passage height reduction portion and the oblique portion do not overlap with one another, for instance, it is possible to increase the reduction rate of the flow-passage cross-sectional area per unit length in the cooling passage. Thus, by providing, in a region where more cooling is needed, a section where the flow-passage height reduction portion and the oblique portion overlap with one another, it is possible to ensure necessary cooling capacity.

(5) In some embodiments, in the above configuration (3) or (4), an inner wall surface of the first branch flow passage forming the flow-passage height reduction portion includes a tapered wall surface which is oblique with respect to the extension direction of the cooling passage, and an obliquity angle of the oblique portion with respect to the extension direction of the cooling passage is greater than an obliquity angle of the tapered wall surface with respect to the extension direction.

For instance, in a case where a high-temperature component is produced by metal additive fabrication or precision casting, when the obliquity angle of the oblique portion with respect to the extension direction of the cooling passage decreases, it is difficult to ensure a gap in a region where the gap is small between the inner wall surface of the cooling passage and the tip end portion of the oblique portion oriented in a direction which intersects with the extension direction of the cooling passage, which makes it difficult to form the oblique portion precisely.

In contrast, at the flow-passage height reduction portion, it is necessary to let the cooling medium flow. Thus, even in the most downstream region of the flow-passage height reduction portion, the tapered wall surface is separated by a distance from the wall surface that faces the tapered wall surface. Thus, even in a case where a high-temperature component is produced by metal additive fabrication and precision casting for instance, it is possible to form the flow-passage height reduction portion even if the obliquity angle of the tapered wall surface with respect to the extension direction of the cooling passage is hypothetically zero angular degree.

With the above configuration (5), the obliquity angle of the oblique portion with respect to the extension direction of the cooling passage is greater than the obliquity angle of the tapered wall surface with respect to the extension direction of the cooling passage, and thus it is possible to form the oblique portion more precisely when producing a high-temperature component by metal additive fabrication or precision casting, for instance.

(6) In some embodiments, in any one of the above configurations (1) to (5), each of the cooling passages is partitioned into a pair of the first branch flow passages by the first partition wall in a width direction of the cooling passage, and the oblique portion is formed such that a dimension Ht in a height direction of the cooling passage orthogonal to the width direction gradually increases toward the downstream side.

With the above configuration (6), of the section along the flow of the cooling medium in the cooling passage, in the section where the oblique portion is provided, of the pair of inner wall surfaces (pair of flow passage inner wall surfaces) facing one another in the height direction, one of the passage inner wall surfaces is connected to the oblique portion, and the other passage inner wall surface has a gap from the oblique portion. Thus, in the section where the oblique portion is provided, the efficiency of the cooling by the cooling medium, that is, the cooling capacity, is different between one passage inner wall surface and the other passage inner wall surface. Thus, with the above configuration (6), by determining the position of the oblique portion in the high-temperature component taking into account the above difference in the cooling capacity, it is possible to suppress excess or shortage with respect to the cooling capacity required for the high-temperature component.

(7) In some embodiments, in the above configuration (6), the high-temperature component further includes a heating target surface at one side of the cooling passage in the height direction. The oblique portion is formed so as to stand from a first passage inner wall surface closer to the heating target surface of the high-temperature component toward a second passage inner wall surface, of a pair of passage inner wall surfaces which face one another in the height direction so as to form the cooling passage.

With the above configuration (7), of the section along the flow of the cooling medium in the cooling passage, in the section where the oblique portion is provided, the first passage inner wall surface is connected to the oblique portion, and the second passage inner wall surface has a gap from the oblique portion. Thus, it is possible to enhance cooling capacity of the first passage inner wall surface, compared to the second passage inner wall surface. Furthermore, the first passage inner wall surface is a passage inner wall surface closer to the heating target surface, of the pair of passage inner wall surfaces facing one another in the height direction. Thus, with the above configuration (7), it is possible to transmit heat from the heating target surface efficiently to the cooling medium, and suppress overheating of the first passage inner wall surface.

(8) In some embodiments, in the above configuration (6), the high-temperature component further includes a heating target surface at one side of the cooling passage in the height direction. The oblique portion is formed so as to stand from a second passage inner wall surface farther from the heating target surface of the high-temperature component toward a first passage inner wall surface, of a pair of passage inner wall surfaces which face one another in the height direction so as to form the cooling passage.

With the above configuration (8), of the section along the flow of the cooling medium in the cooling passage, in the section where the oblique portion is provided, the second passage inner wall surface is connected to the oblique portion, and the first passage inner wall surface has a gap from the oblique portion. Thus, it is possible to suppress cooling capacity of the first passage inner wall surface, compared to the second passage inner wall surface. Furthermore, the second passage inner wall surface is a passage inner wall surface farther from the heating target surface, of the pair of passage inner wall surfaces facing one another in the height direction. In other words, the first passage inner wall surface is a passage inner wall surface closer to the heating target surface, of the pair of passage inner wall surfaces facing one another in the height direction. Thus, with the above configuration (8), it is possible to suppress transmission of heat from the heating target surface to the cooling medium, and suppress excessive cooling of the first passage inner wall surface.

(9) In some embodiments, in any one of the above configurations (6) to (8), the oblique portion has an obliquity angle of not greater than 45 angular degrees with respect to the extension direction of the cooling passage.

With the above configuration (9), the obliquity angle of the oblique portion is 45 angular degrees or smaller, and thus it is possible to suppress rapid decrease of the flow-passage cross-sectional area of the cooling passage from the upstream side toward the downstream side, and thus it is possible to suppress a rapid increase of the coefficient of heat transfer to the cooling medium. Thus, it is possible to suppress generation of a region where the temperature of the high-temperature component rapidly decreases, and prevent deterioration of the durability of the high-temperature component.

Furthermore, in a case where the high-temperature component is formed by metal additive fabrication, if the segment is formed by lamination from the upstream side toward the downstream side of the cooling passage, it is possible to suppress the overhang angle at the oblique portion to 45 angular degrees or less, and thus it is possible to form the oblique portion precisely.

(10) In some embodiments, in any one of the above configurations (1) to (5), each of the cooling passages is partitioned into a pair of the first branch flow passages by the first partition wall in a width direction of the cooling passage, and the oblique portion is formed such that a dimension Wt in the width direction gradually increases toward the downstream side.

With the above configuration (10), of the section along the flow of the cooling medium in the cooling passage, in the section where the oblique portion is provided, both of the pair of inner wall surfaces (pair of passage inner wall surfaces) facing one another in the height direction orthogonal to the width direction may be connected to the oblique portion. Thus, in the section where the oblique portion is provided, it is possible to suppress difference in the efficiency of the cooling by the cooling medium, that is, the cooling capacity between one passage inner wall surface and the other passage inner wall surface. Thus, the above configuration (10) is suitable to a case where there should not be difference in the cooling capacity between one passage inner wall surface and the other passage inner wall surface.

(11) In some embodiments, in any one of the above configurations (1) to (10), the high-temperature component includes a second partition wall disposed in the first branch flow passage at a downstream side of the first partition wall to partition the first branch flow passage into a plurality of second branch flow passages midway.

With the above configuration (11), it is possible to increase the number of branch stages by partitioning the first branch flow passage into a plurality of second branch flow passages midway, and increase the regulation range of the cooling capacity.

(12) In some embodiments, in any one of the above configurations (1) to (11), an upstream end portion of the oblique portion connecting to a side surface of the first partition wall at the oblique portion has a chamfered corner.

With the above configuration (12), it is possible to suppress pressure loss of the cooling passage in the region where the oblique portion is formed.

(13) In some embodiments, in any one of the above configurations (1) to (12), the high-temperature component includes a heating target surface at one side in a height direction of the cooling passage. A first flow passage inner wall surface closer to the heating target surface, of a pair of passage inner wall surfaces which face one another in the height direction so as to form the cooling passage, is oblique with respect to the heating target surface such that a distance to the heating target surface reduces from the upstream side toward the downstream side of the cooling flow passage.

With the above configuration (13), the distance between the heating target surface and the first passage inner wall surface reduces from the upstream side toward the downstream side of the cooling passage, and thus it is possible to suppress excessive cooling in the section at the upstream side of the cooling passage while preventing shortage of cooling capacity even when the temperature of the cooling medium increases toward the downstream side in the cooling passage.

(14) According to an embodiment of the present invention, a method of producing a high-temperature component which requires cooling by a cooling medium includes: a step of, by metal additive fabrication, forming a plurality of cooling passages through which the cooling medium is able to flow inside the high-temperature component, and forming a first partition wall disposed inside each of the cooling passages to partition the cooling passage into a plurality of first branch flow passages. The first partition wall includes an oblique portion formed such that, in an upstream side region of the first partition wall, a flow-passage cross-sectional area of the cooling passage as seen in an extension direction of the cooling passage gradually decreases from an upstream side toward a downstream side.

According to the above method (14), by providing the first partition wall inside the cooling passage, it is possible to reduce the flow-passage cross-sectional area of the cooling passage as seen in the extension direction of the cooling passage. Accordingly, as described above, the flow velocity of the cooling medium flowing through the cooling passage becomes faster in the first branch passages being a section where the first partition wall is provided, than in a section at the upstream side of the first branch flow passages where the first partition wall is not provided. Thus, it is possible to have a greater coefficient of heat transfer to the cooling medium in the first branch flow passage, than in the section at the upstream side of the first branch flow passage.

Furthermore, as described above, by providing the first partition wall inside the cooling passage, the total area of the areas per unit section of the inner wall surfaces of the plurality of first branch flow passages of the plurality of first branch flow passages becomes greater than the area per unit length of the inner wall surface of the cooling passage in the section at the upstream side of the first branch flow passage.

Accordingly, it is possible to provide a high-temperature component configured to suppress excessive cooling in the section at the upstream side of the first branch flow passages, while preventing shortage of cooling capacity even when the temperature of the cooling medium increases toward the downstream side in the first branch flow passages.

Furthermore, with the above configuration (14), in the section of the cooling passage where the oblique portion is formed, the flow-passage cross-sectional area of the cooling passage gradually decreases from the upstream side toward the downstream side. Accordingly, it is possible to suppress rapid decrease of the flow-passage cross-sectional area of the cooling passage from the upstream side toward the downstream side, and rapid increase of the area per unit length of the inner wall surface of the cooling passage from the upstream side toward the downstream side, and thereby suppress rapid increase of the coefficient and amount of heat transfer to the cooling medium as described above. Thus, it is possible to suppress generation of a region where the temperature of the high-temperature component rapidly decreases, and prevent deterioration of the durability of the high-temperature component.

Advantageous Effects

According to an embodiment of at least one embodiment of the present invention, it is possible to provide a high-temperature component that can suppress excessive cooling while preventing shortage of cooling capacity.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

In the following description, a high-temperature component according to some embodiments is described referring to a high-temperature component used in a gas turbine.

Figure 1:
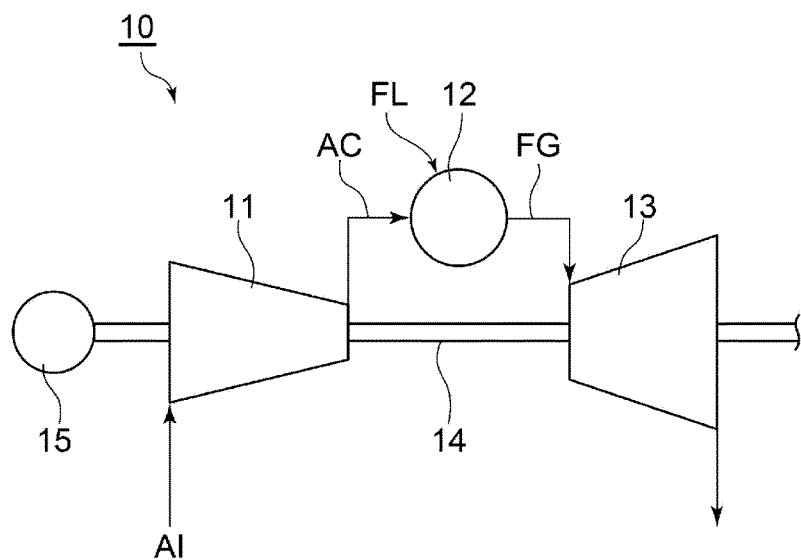
FIG. 1 is a schematic diagram of an overall configuration of a gas turbine.
Figure 2:
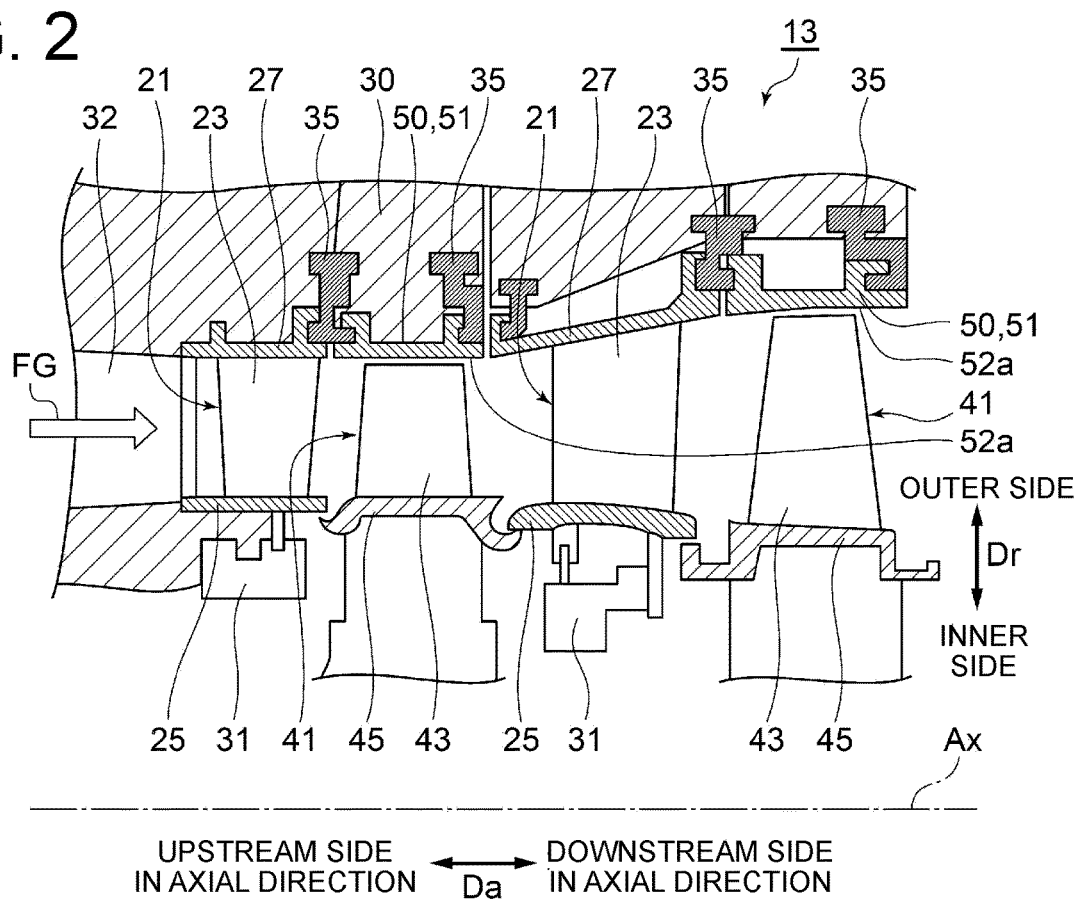
FIG. 2 is a cross-sectional view showing a gas flow passage of a turbine.

FIG. 1 is a schematic diagram of an overall configuration of a gas turbine. FIG. 2 is a cross-sectional view showing a gas flow passage of a turbine.

In the present embodiment, as depicted in FIG. 1, the gas turbine 10 includes a compressor 11, a combustor 12, and a turbine 13 arranged coaxially via a rotor 14. A generator 15 is coupled to an end portion of the rotor 14. In the following description, the extension direction of the axis of the rotor 14 is referred to as the axial direction Da, the circumferential direction about the axis of the rotor 14 is referred to as the circumferential direction Dc, and the direction perpendicular to the axis Ax of the rotor 14 is referred to as the radial direction Dr. Furthermore, of the circumferential direction Dc, the rotational direction of the rotor 14 is indicated as the rotational direction R.

The compressor 11 generates compressed air AC having a high temperature and a high pressure, as air AI sucked in from an air inlet flows through a plurality of stator vanes and a plurality of rotor blades to be compressed. The combustor 12 supplies a predetermined fuel FL to the compressed air AC, and combusts the compressed air, whereby combustion gas FG having a high temperature and a high pressure is generated. The turbine 13 rotary drives the rotor 14 as the high-temperature and high-pressure combustion gas FG generated by the combustor 12 passes through the plurality of stator vanes and the rotor blades, and drives the generator 15 coupled to the rotor 14.

Furthermore, as depicted in FIG. 2, in the turbine 13, the turbine stator vanes (stator vanes) 21 are fixed to the inner shroud 25 at the hub side of airfoil portions 23, and fixed to the outer shroud 27 at the tip side of the airfoil portions 23. The turbine rotor blades (rotor blades) 41 are fixed to a platform 45 at the base end portion of airfoil portions 43. Furthermore, the outer shroud 27 and the ring segment 50 disposed at the tip end portion side of the rotor blades 41 are supported by the casing (turbine casing) 30 via a heat insulation ring 35, and the inner shroud 25 is supported by a support ring 31. Thus, the combustion gas flow passage 32 through which the combustion gas FG passes is formed along the axial direction Da as a space surrounded by the inner shroud 25, the outer shroud 27, the platform 45, and the ring segment 50.

Furthermore, the inner shroud 25, the outer shroud 27, and the ring segment 50 function as gas path surface forming members. A gas path surface forming member is a member that defines the combustion gas flow passage 32 and has a gas path surface that makes contact with the combustion gas FG.

The combustor 12, the rotor blades 41 (e.g., platform 45), the stator vanes 21 (e.g., the inner shroud 25 and the outer shroud 27) and the ring segment 50, for instance, are high-temperature components used under a high-temperature environment which make contact with the combustion gas FG, and require cooling by a cooling medium. In the following description, the cooling structure of the ring segment 50 will be described as an example of a cooling structure of a high-temperature component.

Figure 3:
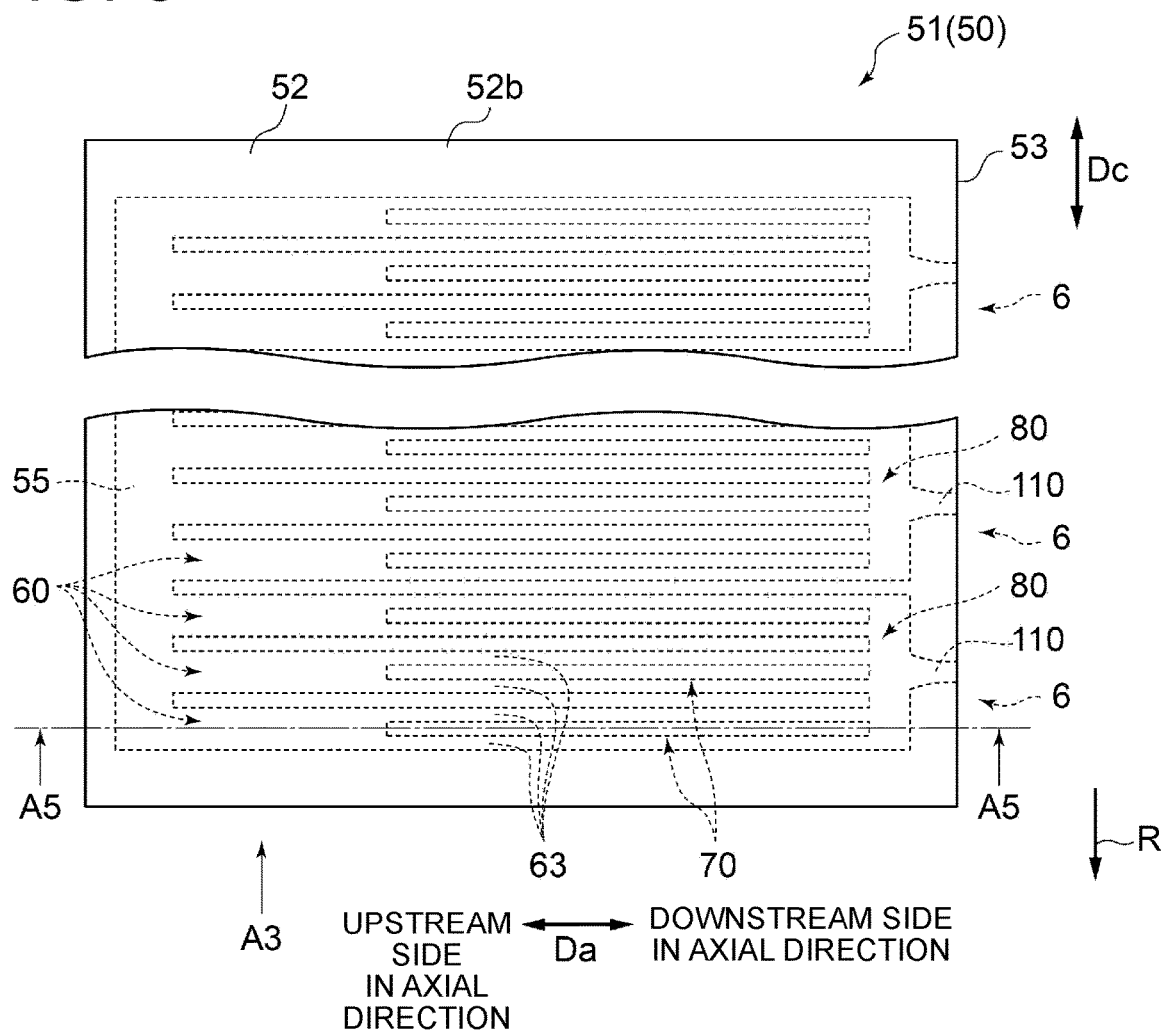
FIG. 3 is a schematic planar view of a segment body according to some embodiments as seen from the outer side in the radial direction, and a schematic side view of the same as seen along the circumferential direction from the downstream side in the rotational direction of the rotor toward the upstream side in the rotational direction of the rotor.
Figure 3:
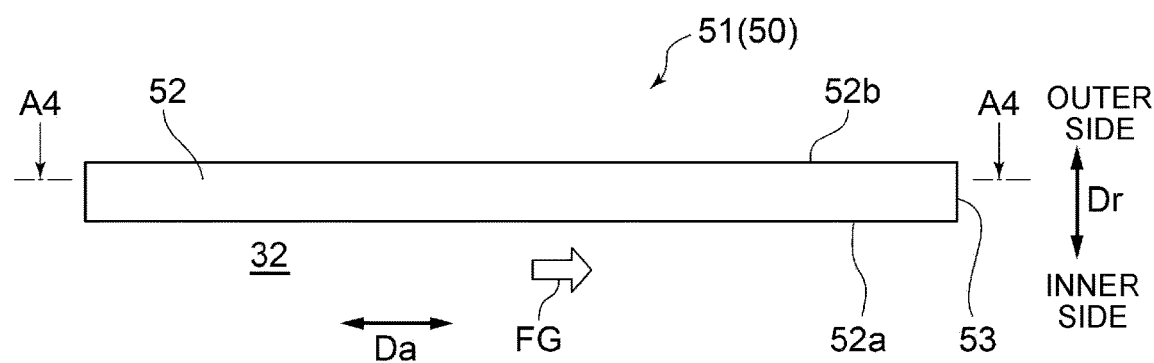
Figure 4:
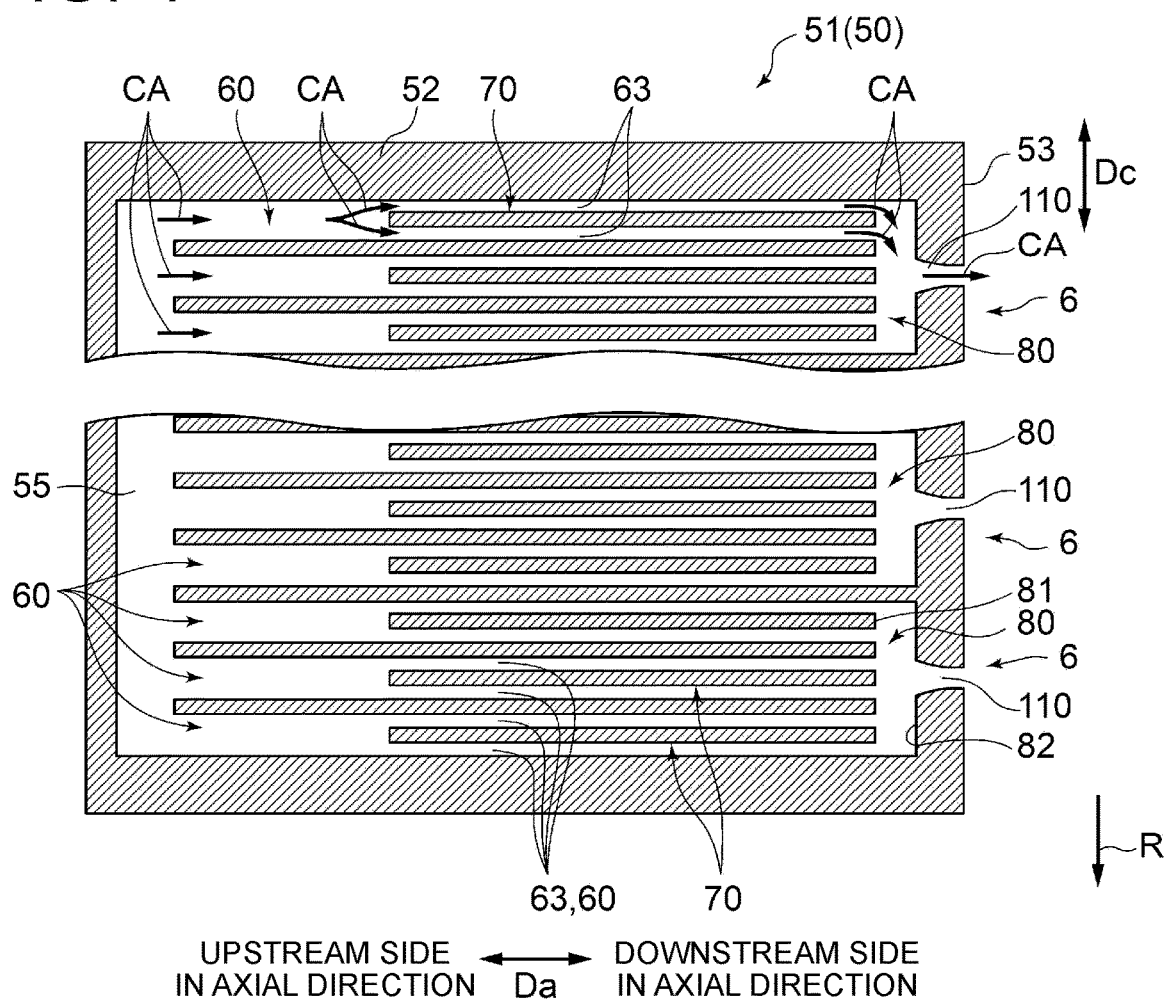
FIG. 4 is a cross-sectional view taken along line A4-A4 in FIG. 3, as seen in the direction of the arrows A4.
Figure 5:
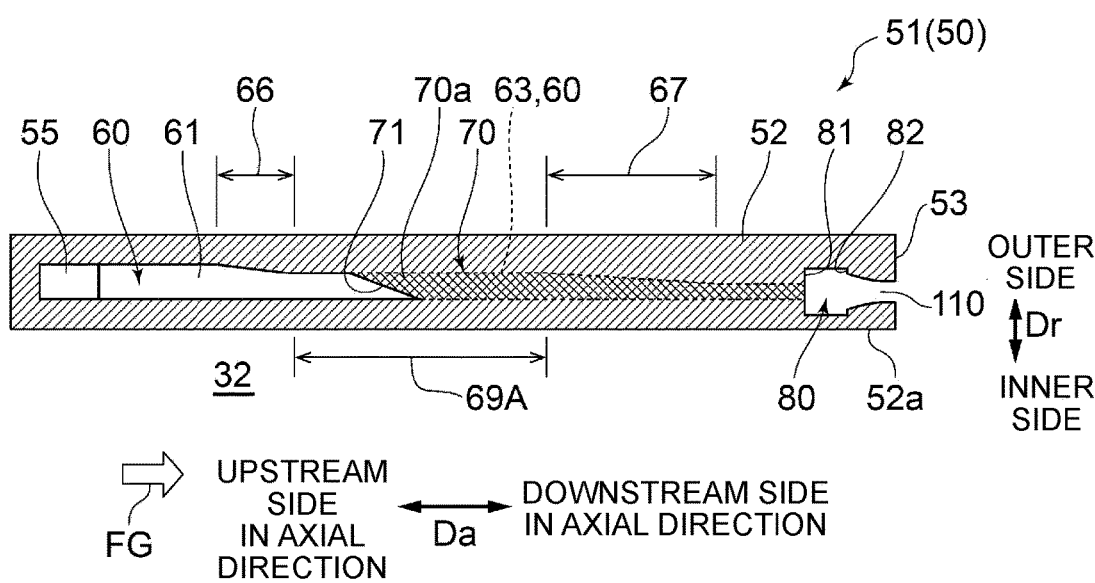
FIG. 5 is a cross-sectional view taken along line A5-A5 in FIG. 3, as seen in the direction of the arrows A5.

FIG. 3 is a schematic planar view of a segment body 51 constituting a ring segment 50 according to some embodiments as seen from the outer side in the radial direction Dr, and a schematic side view of the same as seen along the circumferential direction Dc from the downstream side in the rotational direction R of the rotor 14 toward the upstream side in the rotational direction R. FIG. 4 is a cross-sectional view taken along line A4-A4 in FIG. 3, as seen in the direction of the arrows A4. FIG. 5 is a cross-sectional view taken along line A5-A5 in FIG. 3, as seen in the direction of the arrows A5. In FIGS. 3 to 5, the structure of the segment body 51 is depicted schematically. Thus, in FIGS. 3 and 5 for instance, hooks and the like for attaching the segment body 51 to the heat insulation ring 35 are omitted from drawings.

The ring segment 50 according to some embodiments includes a plurality of segment bodies 51 formed into an annular shape in the circumferential direction Dc. Each segment body 51 includes a body 52 inside which a cooling flow passage is formed as a main component. As depicted in FIG. 2, the segment body 51 is disposed such that the inner surface 52a in the radial direction Dr faces the combustion gas flow passage 32 through which the combustion gas FG flows. At the inner side of the segment body 51 in the radial direction Dr, rotor blades 41 that rotate about the rotor 14 are arranged at regular intervals. To prevent thermal damage from the high-temperature combustion gas FG, the segment body 51 has a plurality of axial-direction passages (cooling passages) 60 formed thereon, extending in the axial direction Da.

The plurality of cooling passages 60 are disposed in parallel in the circumferential direction Dc.

Although not depicted, in a gas turbine 10 according to an embodiment, each segment body 51 according to some embodiments is configured to be supplied with cooling air CA from the side of the outer surface 52b. The cooling air CA supplied to the segment body 51 cools the body 52 of the segment body 51 by convective cooling, in the course of flowing through the cooling passages 60 and being discharged into the combustion gas FG.

Hereinafter, the cooling passage 60 according to some embodiments will be described.

Each of the cooling passages 60 according to some embodiments is connected at a cooling air manifold 55 at an upstream end. Inside each of the cooling passages 60 according to some embodiments, a first partition wall 70 which partitions the cooling passage 60 into a plurality of first branch flow passages 63 midway is formed. In some embodiments, the first partition wall 70 partitions the cooling passage midway into a pair of first branch flow passages 63. In FIG. 5, and FIGS. 6 to 12 described below, the area corresponding to the cross-section of the first partition wall 70 is cross-hatched.

The first partition wall 70 may divide the cooling passage 60 into the plurality of first branch flow passages 63 completely, or incompletely. That is, the first partition wall 70 may be formed continuously between the first passage inner wall surface 601 and the second passage inner wall surface 602 described below along the radial direction Dr, or may have a gap separated in the radial direction Dr between the first passage inner wall surface 601 and the second passage inner wall surface 602.

Each of the plurality of first branch flow passages 63 has a downstream end connected to the header portion 80. In some embodiment, for instance, the downstream ends of six first branch flow passages 63 of adjacent three cooling passages 60 are connected to the inner wall 81 at the upstream side of a single header portion 80. In some embodiments, the segment body 51 has a plurality of header portions 80 formed thereon.

On the inner wall 82 at the downstream side of each header portion 80, a single outlet passage 110 is formed, for discharging the cooling air CA flowing into the header portion to the outside of the header portion 80, that is, the outside of the segment body 51. The outlet passage 110 has an opening which opens into the combustion gas FG at the downstream-side end portion 53 of the segment body 51 in the axial direction Da.

In some embodiments, the segment body 51 includes a plurality of cooling passage groups 6, each of which includes a single header portion 80, three cooling passages 60 having downstream ends connected to the header portion 80, and a single outlet passage 110 connected to the header portion 80.

The cooling air CA supplied to the segment body 51 from the outside of the segment body 51 is supplied to the cooling air manifold 55, and then distributed to each cooling passage 60 from the cooling air manifold 55. The cooling air CA distributed to each cooling passage 60 is partitioned by the first partition wall 70, and then flows into each first branch flow passage 63. After flowing into each first branch flow passage 63, the cooling air CA is collected in each header portion 80, and then discharged outside of the segment body 51 from the outlet passage 110.

The cooling air CA is introduced to each cooling passage 60 from the cooling air manifold 55, and then heated up by heat input from the body 52 while flowing toward the downstream side in the axial direction Da. Thus, as the cooling air CA advances toward the downstream side in the axial direction Da, the cooling air CA flowing through each cooling passage 60 is overheated, and the cooling capacity of the cooling air CA decreases. Thus, the region at the downstream side of the segment body 51 in the axial direction Da tends to have a high temperature than the rest of the region. Thus, when the flow amount of the cooling air CA is increased, for instance, in order to prevent shortage of the cooling capacity at the downstream side of the cooling passage, the cooling capacity becomes excessive at the upstream side of the cooling passage 60.

In a machine that operates with a high-temperature working gas such as a gas turbine and a rocket engine, excessive cooling generally leads to deterioration of the heat efficiency of the machine. Thus, it is desired to suppress excessive cooling while preventing shortage of cooling capacity.

Thus, in some embodiments, the cooling structure of the segment body 51 has a configuration described below, in order to suppress excessive cooling and shortage of cooling capacity.

Figure 6:
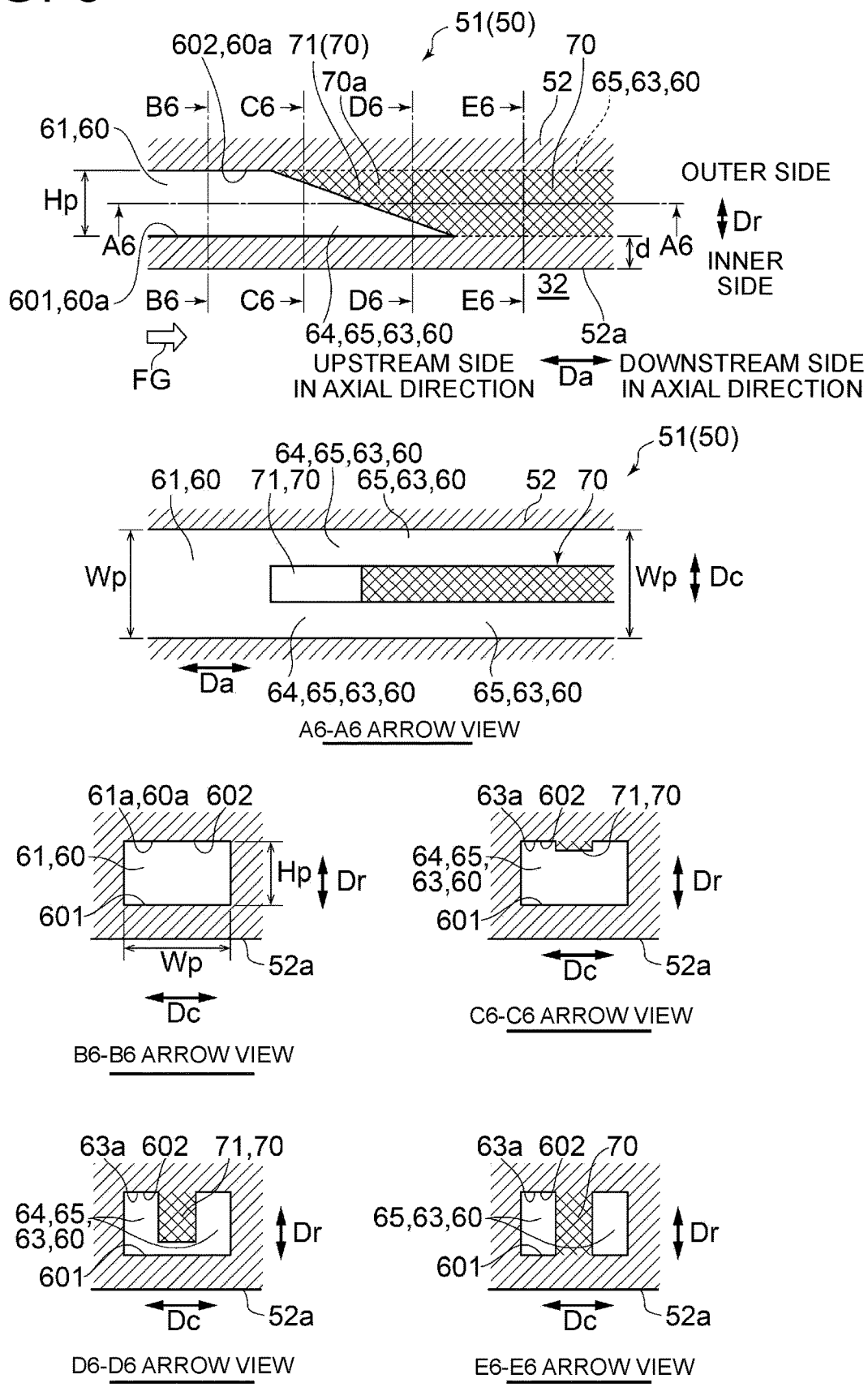
FIG. 6 is a schematic cross-sectional view of a part of a cooling passage of a segment body according to an embodiment.

FIG. 6 is a schematic cross-sectional view of a part of the cooling passage 60 of the segment body 51 according to an embodiment. In FIG. 6, an enlarged cross-sectional view of the area in the vicinity of the upstream-side end portion of the first partition wall 70 in FIG. 5 is depicted alongside with the A6-A6 arrow cross-sectional view, B6-B6 arrow cross-sectional view, C6-C6 arrow cross-sectional view, D6-D6 arrow cross-sectional view, and E6-E6 arrow cross-sectional view taken from the enlarged cross-sectional view.

Figure 7:
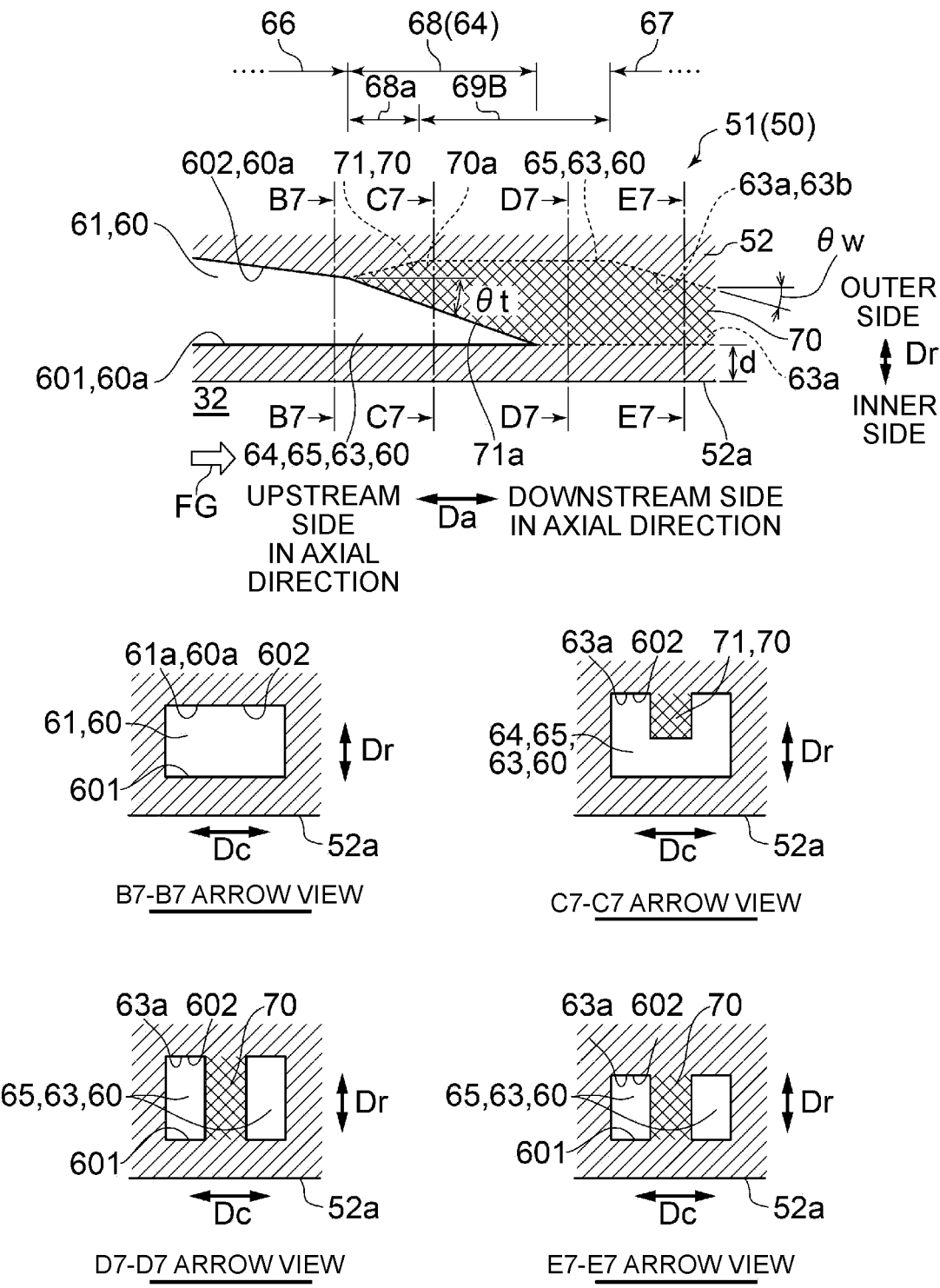
FIG. 7 is a schematic cross-sectional view of a part of a cooling passage of a segment body according to another embodiment.

FIG. 7 is a schematic cross-sectional view of a part of the cooling passage 60 of the segment body 51 according to another embodiment. In FIG. 7, a cross-sectional view corresponding to the enlarged cross-sectional view of the area in the vicinity of the upstream-side end portion of the first partition wall 70 in FIG. 5 is depicted alongside with the B7-B7 arrow cross-sectional view, C7-C7 arrow cross-sectional view, D7-D7 arrow cross-sectional view, and E7-E7 arrow cross-sectional view taken from the above cross-sectional view.

Figure 8:
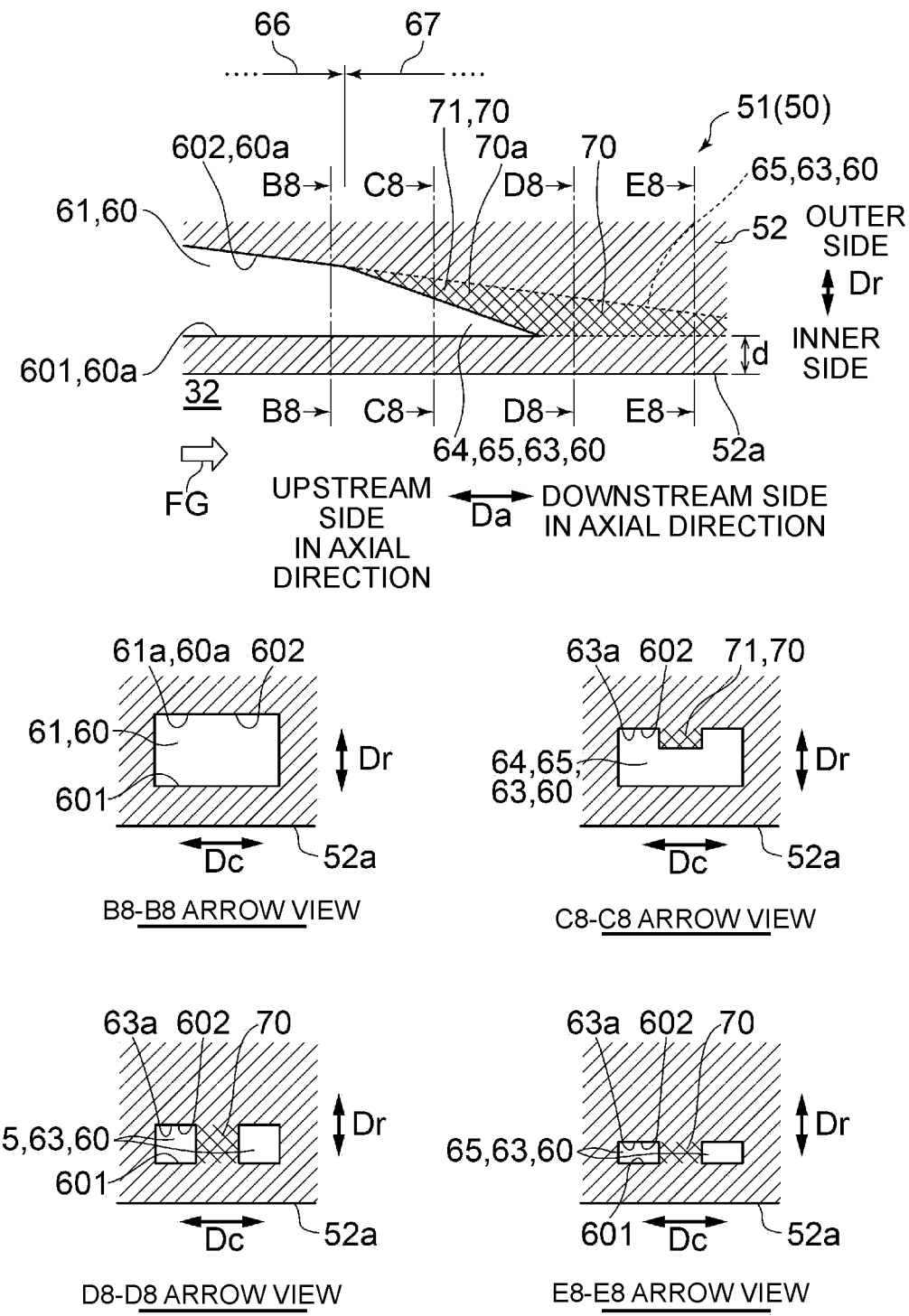
FIG. 8 is a schematic cross-sectional view of a part of a cooling passage of a segment body according to yet another embodiment.

FIG. 8 is a schematic cross-sectional view of a part of the cooling passage 60 of the segment body 51 according to yet another embodiment. In FIG. 8, a cross-sectional view corresponding to the enlarged cross-sectional view of the area in the vicinity of the upstream-side end portion of the first partition wall 70 in FIG. 5 is depicted alongside with the B8-B8 arrow cross-sectional view, C8-C8 arrow cross-sectional view, D8-D8 arrow cross-sectional view, and E8-E8 arrow cross-sectional view taken from the above cross-sectional view.

Figure 9:
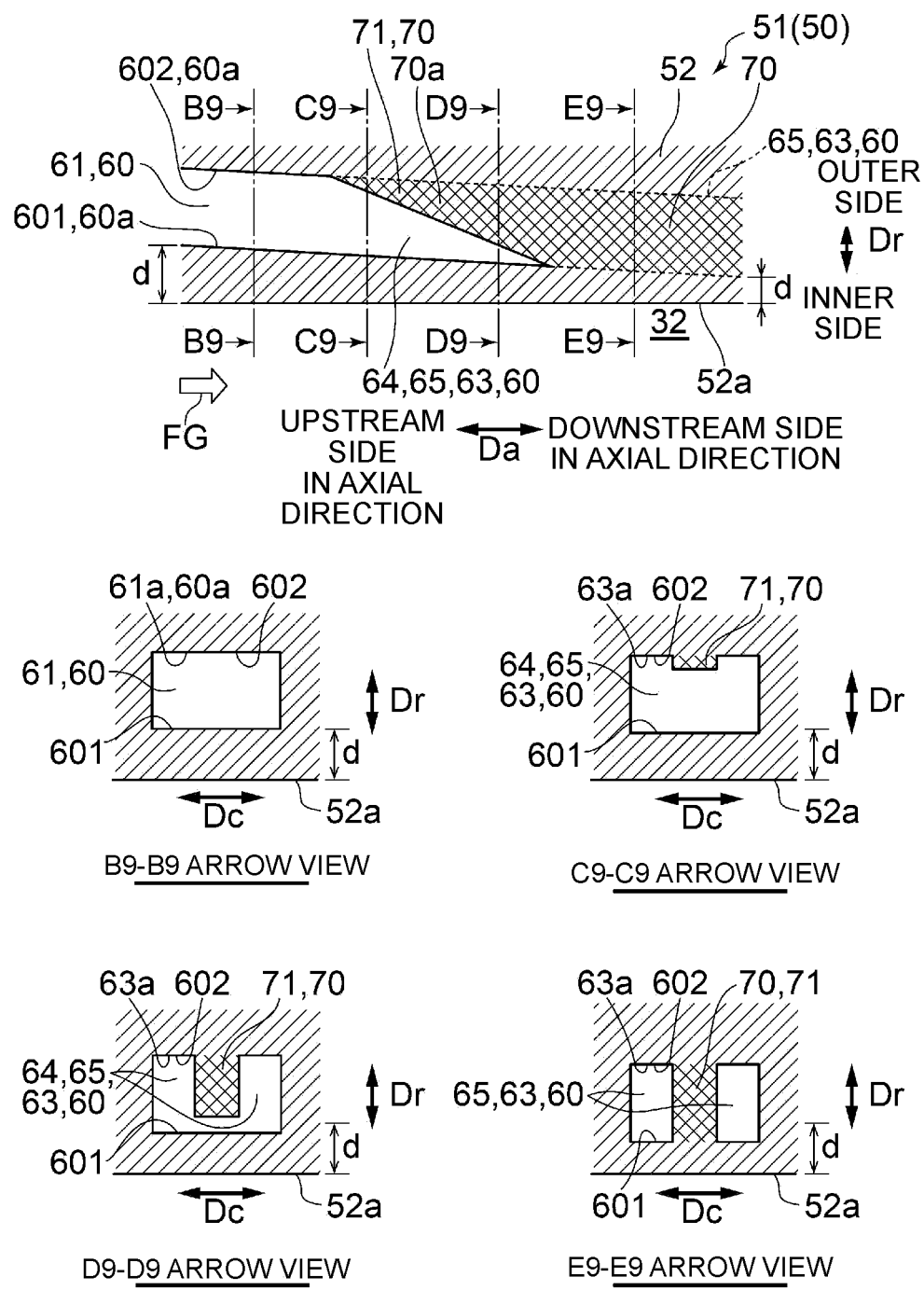
FIG. 9 is a schematic cross-sectional view of a part of a cooling passage of a segment body according to yet another embodiment.

FIG. 9 is a schematic cross-sectional view of a part of the cooling passage 60 of the segment body 51 according to yet another embodiment. In FIG. 9, a cross-sectional view corresponding to the enlarged cross-sectional view of the area in the vicinity of the upstream-side end portion of the first partition wall 70 in FIG. 5 is depicted alongside with the B9-B9 arrow cross-sectional view, C9-C9 arrow cross-sectional view, D9-D9 arrow cross-sectional view, and E9-E9 arrow cross-sectional view taken from the above cross-sectional view.

(Provision of the First Partition Wall 70)

In some embodiments, as depicted in FIGS. 3 to 9, the segment body 51 has a first partition wall 70 which partitions the cooling passage 60 into a plurality of first branch flow passages 63 midway.

By providing the first partition wall 70 inside the cooling passage 60, as depicted in FIGS. 6 to 9, it is possible to reduce the flow-passage cross-sectional area of the cooling passage 60 as seen in the extension direction of the cooling passage 60. Accordingly, the flow velocity of the cooling medium (cooling air CA) flowing through the cooling passage 60 becomes faster in the first branch passages 63 being a section where the first partition wall 70 is provided, than in a section 61 at the upstream side of the first branch flow passage 63, where the first partition wall 70 is not provided. Thus, it is possible to have a greater coefficient of heat transfer to the cooling air CA in the first branch flow passages 63, than in the section 61 at the upstream side of the first branch flow passages 63.

Furthermore, by providing the first partition wall 70 inside the cooling passage 60, the total area of the areas of the inner wall surfaces 63a of the plurality of first branch flow passages 63 per unit section of the plurality of first branch flow passages 63 becomes greater than the area per unit length of the inner wall surface 60a (inner wall surface 61a) of the cooling passage 60 in the section 61 at the upstream side of the first branch flow passage 63.

Accordingly, it is possible to suppress excessive cooling in the section 61 at the upstream side of the first branch flow passages 63, while preventing shortage of cooling capacity even when the temperature of the cooling air CA increases toward the downstream side in the first branch flow passages 63.

When the flow-passage cross-sectional area of the cooling passage 60 rapidly decreases from the upstream side toward the downstream side, from the section (section 61) before (upstream side of) the rapid decrease of the flow-passage cross-sectional area toward the section after (downstream side of) the rapid decrease, the coefficient of heat transfer to the cooling air CA rapidly increases, which may generate a region where the temperature of the segment body 51 being a high-temperature component rapidly decreases. Furthermore, when the area per unit length of the inner wall surface 60a of the cooling passage 60 rapidly increases from the upstream side toward the downstream side, from the section (section 61) before (upstream side of) the rapid increase of area of the inner wall surface 60a toward the section after (downstream side of) the rapid increase, the amount of heat transfer to the cooling air CA rapidly increases, which may create a region where the temperature of the segment body 51 rapidly decreases.

When the temperature of 5a high-temperature component like the segment body 51 rapidly changes in a local 6b region, the thermal stress increases, which may have a negative impact on the durability of the high-temperature component. Furthermore, the thermal efficiency may deteriorate due to excessive cooling.

Thus, in some embodiments, as depicted in FIGS. 5 to 9, the first partition wall 70 is formed so as to include an oblique portion 71. In some embodiments, as depicted in FIGS. 5 to 9, the oblique portion 71 is formed such that, in the upstream side region 70a of the first partition wall 70, the flow-passage cross-sectional area of the cooling passage 60 as seen in the extension direction of the cooling passage 60 gradually decreases from the upstream side toward the downstream side.

Accordingly, in the section 64 of the cooling passage 60 where the oblique portion 71 is formed, the flow-passage cross-sectional area of the cooling passage 60 gradually decreases from the upstream side toward the downstream side. This is because, the height of the oblique portion 71, that is, the dimension of the oblique portion 71 in the radial direction Dr gradually increases from the upstream side toward the downstream side, and thereby the ratio of the cross section of the oblique portion 71 to the cross section of the cooling passage 60 along the radial direction Dr gradually increases from the upstream side toward the downstream side. In other words, this is because, the ratio of the dimension of the oblique portion 71 in the radial direction Dr to the dimension of the cooling passage 60 in the radial direction Dr gradually increases from the upstream side toward the downstream side, and thereby the ratio of the cross section of the oblique portion 71 to the cross section of the cooling passage 60 along the radial direction Dr gradually increases from the upstream side toward the downstream side.

Accordingly, it is possible to suppress rapid decrease of the flow-passage cross-sectional area of the cooling passage 60 from the upstream side toward the downstream side, and rapid increase of the area per unit length of the inner wall surface 60a of the cooling passage 60 from the upstream side toward the downstream side, and thereby suppress rapid increase of the coefficient and amount of heat transfer to the cooling air CA as described above. Thus, it is possible to suppress generation of a region where the temperature of the segment body 51 rapidly decreases, and prevent deterioration of the durability of the segment body 51. Furthermore, it is possible to suppress deterioration of the thermal efficiency due to excessive cooling.

Furthermore, in some embodiments, the dimension Wp of the cooling passage 60 in the width direction is the same in the section not partitioned by the first partition wall 70 (section 61) and the section partitioned by the first partition wall 70 (section 65). Furthermore, as long as the advantageous effect of providing the first partition wall 70 is not impaired, the dimension Wp of the cooling passage 60 in the width direction may be different between the section not partitioned by the first partition wall 70 (section 61) and the section partitioned by the first partition wall 70 (section 65).

In some embodiments, the circumferential direction Dc of the cooling passage 60 is referred to as the width direction of the cooling passage 60. Furthermore, in some embodiments, the radial direction Dr orthogonal to the width direction of the cooling passage 60 is referred to as the height direction of the cooling passage 60.

(Dimension Hp of the Cooling Passage 60 in the Height Direction)

For instance, as depicted in FIG. 5, the cooling passage 60 includes flow-passage height reduction portions 66, 67 where the dimension Hp of the cooling passage 60 in the height direction gradually decreases toward the downstream side. At the flow-passage height reduction portion 67, the dimension Hp of the cooling passage 60 in the height direction and the dimension of the first partition wall 70 in the height direction are equal.

Accordingly, it is possible to gradually decrease the flow-passage cross-sectional area of the cooling passage 60 at the flow-passage height reduction portions 66, 67, and thus it is possible to gradually increase the flow velocity of the cooling air CA, that is, the heat transfer coefficient, at the flow-passage height reduction portions 66, 67. Thus, it is possible to prevent shortage of cooling capacity even when the temperature of the cooling air CA increases toward the downstream side at the flow-passage height reduction portions 66, 67.

The flow-passage height reduction portion 66 gradually decreases the flow-passage cross-sectional area of the cooling passage 60 in the section 61 at the upstream side of the first branch flow passage 63. The flow-passage height reduction portion 67 gradually decreases the flow-passage cross-sectional area of the cooling passage 60 (the first branch flow passage 63) at least in the section at the downstream side of the oblique portion 71, of the section 65 partitioned by the first partition wall 70.

Herein, the flow-passage height reduction portion 66 is also referred to as the first flow-passage height reduction portion 66, and the flow-passage height reduction portion 67 is also referred to as the second flow-passage height reduction portion 67.

In the embodiment depicted in FIG. 5, a section where the dimension Hp in the height direction of the cooling passage 60 is constant exists between the first flow-passage height reduction portion 66 and the second flow-passage height reduction portion 67, and the section is also referred to as a first flow-passage height constant portion 69A. In the embodiment depicted in FIG. 5, the oblique portion 71 is disposed in the first flow-passage height constant portion 69A.

For instance, in the embodiment depicted in FIG. 7, the first branch flow passage 63 has a height gradual increase region 68a where the dimension Hp in the height direction of the cooling passage 60 gradually increases toward the downstream side, in the upstream end region 68 of the first branch flow passage adjacent to the oblique portion 71 of the first partition wall 70 in the width direction (that is, section 64).

Accordingly, it is possible to gradually increase the flow-passage cross-sectional area in the upstream end region 68 of the first branch flow passage 63. Thus, it is possible to suppress reduction of the flow-passage cross-sectional area due to provision of the first partition wall 70, and thus it is possible to suppress a rapid increase of the coefficient of heat transfer to the cooling air CA as described above.

Furthermore, in the height gradual increase region 68a, the total area of the respective flow-passage cross-sectional areas of the pair of first branch flow passages 63 partitioned by the first partition wall 70 may decrease gradually toward the downstream side, or increase toward the downstream side, or may be constant toward the downstream side without increasing nor decreasing.

In the embodiment depicted in FIG. 7, a section where the dimension Hp of in the height direction the cooling passage 60 is constant exists between the gradually increasing height gradual increase region 68a and the second flow-passage height reduction portion 67, and the section is also referred to as a second flow-passage height constant portion 69B. In the embodiment depicted in FIG. 7, the oblique portion 71 is disposed in an upstream partial section of the second flow-passage height constant portion 69B.

For instance, in the embodiment depicted in FIG. 8, in the extension direction of the cooling passage 60, the flow-passage height reduction portion 67 and the oblique portion 71 overlap with one another. That is, while the flow-passage height reduction portion 67 and the oblique portion 71 may not necessarily overlap in the extension direction of the cooling passage 60, as in the embodiment depicted in FIG. 7, but may overlap with one another as in the embodiment depicted in FIG. 8.

Furthermore, in the extension direction of the cooling passage 60, the flow-passage height reduction portion 67 and the oblique portion 71 overlap with one another at least partially.

Accordingly, in the section where the flow-passage height reduction portion 67 and the oblique portion 71 overlap with one another, compared to a section where the flow-passage height reduction portion 67 and the oblique portion 71 do not overlap with one another as depicted in FIG. 5, for instance, it is possible to increase the reduction rate of the flow-passage cross-sectional area per unit length in the cooling passage 60. Thus, by providing, in a region where more cooling is required, a section where the flow-passage height reduction portion 67 and the oblique portion 71 overlap with one another, it is possible to ensure necessary cooling capacity.

For instance, in the embodiment depicted in FIG. 7, the inner wall surface 63a of the first branch flow passage 63 forming the flow-passage height reduction portion 67 has a tapered wall surface 63b which is oblique with respect to the extension direction of the cooling passage 60. In the embodiment depicted in FIG. 7, the obliquity angle θt of the oblique portion 71 with respect to the extension direction of the cooling passage 60 is larger than the obliquity angle θw of the tapered wall surface 63b with respect to the extension direction.

For instance, in a case where the segment body 51 is produced by metal additive fabrication or precision casting, when the obliquity angle θt of the oblique portion 71 with respect to the extension direction of the cooling passage 60 decreases, it is difficult to ensure a gap in a region where the gap is small between the inner wall surface 60a of the cooling passage and the tip end portion 71a oriented in a direction which intersects with the extension direction of the cooling passage 60 at the oblique portion 71, which makes it difficult to form the oblique portion 71 precisely.

In this regard, at the flow-passage height reduction portion 67, it is necessary to let the cooling air CA flow. Thus, even in the most downstream region of the flow-passage height reduction portion 67, the tapered wall surface 63b is separated by a distance from the inner wall surface 63a that faces the tapered wall surface 63b. Thus, for instance, even in a case where the segment body 51 is produced by metal additive fabrication and precision casting, it is possible to form a flow passage even if the obliquity angle of the tapered wall surface 63b with respect to the extension direction of the cooling passage 60 is hypothetically zero angular degree.

Thus, according to the embodiment depicted in FIG. 7, the obliquity angle θt of the oblique portion 71 with respect to the extension direction of the cooling passage 60 is greater than the obliquity angle θw of the tapered wall surface 63b with respect to the extension direction of the cooling passage 60, and thus it is possible to form the oblique portion 71 more precisely when producing a high-temperature component by metal additive fabrication or precision casting, for instance.

In the embodiment depicted in FIGS. 5 to 9, the obliquity angle θt (see FIG. 7) of the oblique portion 71 with respect to the extension direction of the cooling passage 60 is not greater than 45 angular degrees.

With the obliquity angle θt of the oblique portion 71 being 45 angular degrees or less, it is possible to suppress rapid decrease of the flow-passage cross-sectional area of the cooling passage 60 from the upstream side toward the downstream side, and thus it is possible to suppress rapid increase of the coefficient of heat transfer to the cooling air CA. Thus, it is possible to suppress generation of a region where the temperature of the segment body 51 rapidly decreases, and prevent deterioration of the durability of the segment body 51.

Furthermore, as described below, in a case where the segment body 51 is formed by metal additive fabrication, if the segment body 51 is formed by lamination from the upstream side toward the downstream side of the cooling passage 60, it is possible to suppress the overhang angle at the oblique portion 71 to be not greater than 45 angular degrees, and thus it is possible to form the oblique portion 71 precisely.

Figure 10:
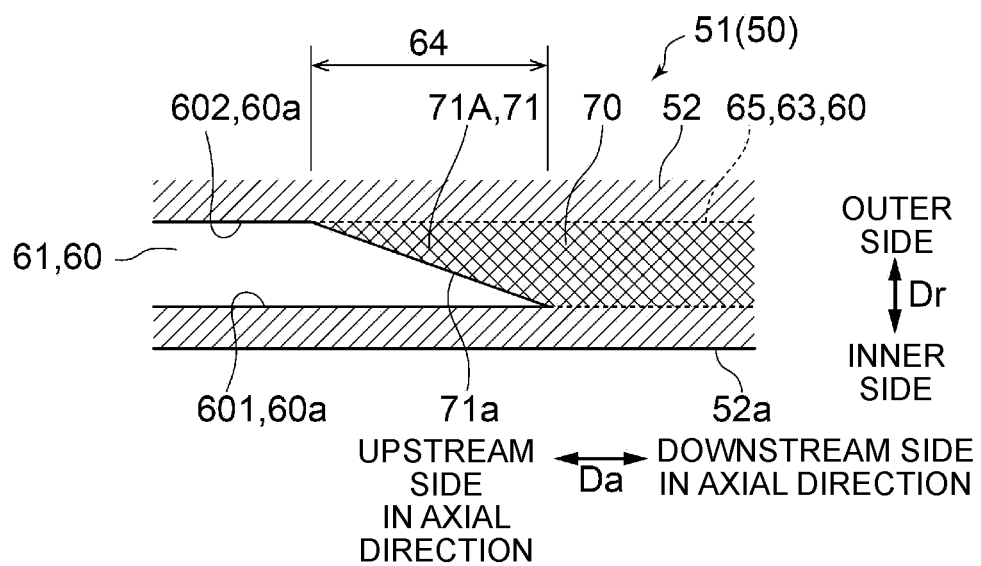
FIG. 10 is a diagram showing two cases in which the tip end portion of the oblique portion is oriented in different directions.
Figure 10:
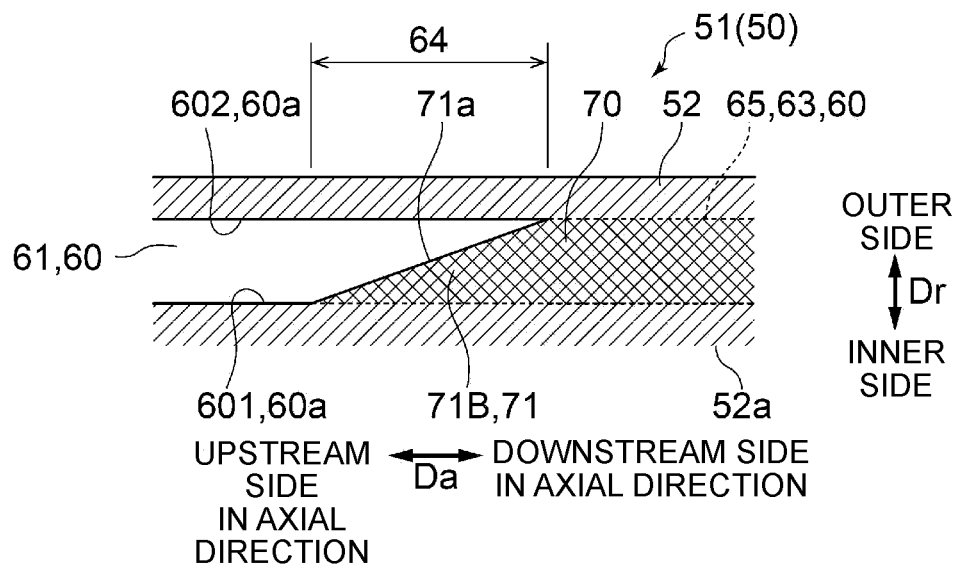

FIG. 10 is a diagram showing two cases in which the tip end portion 71a of the oblique portion 71 is oriented in different directions. The upper diagram in FIG. 10 shows, as depicted in FIGS. 5 to 9, a case in which the oblique portion 71A stands from the inner wall surface 60a at the outer side in the radial direction Dr toward the inner side in the radial direction Dr. The lower diagram in FIG. 10 shows a case in which the oblique portion 71B stands from the inner wall surface 60a at the inner side in the radial direction Dr toward the outer side in the radial direction Dr.

The inner surface 52a of the segment body 51 in the radial direction Dr is a heating target surface to be heated by the combustion gas FG. Thus, in the following description, the inner surface 52a of the segment body 51 in the radial direction Dr is also referred to as a heating target surface 52a.

In a case where the oblique portion 71A is disposed so as to stand from the inner wall surface 60a at the outer side in the radial direction Dr toward the inner side in the radial direction Dr as depicted in the upper diagram in FIG. 10, the oblique portion 71A is disposed so as to stand from the second passage inner wall surface 602 farther from the heating target surface 52a toward the first passage inner wall surface 601, of the pair of passage inner wall surfaces (inner wall surfaces 60a) that face one another in the height direction so as to form the cooling passage 60.

In this case, of the section along the flow of the cooling air CA in the cooling passage 60, in the section 64 where the oblique portion 71A is provided, the second passage inner wall surface 602 is connected to the oblique portion 71A, and the first passage inner wall surface 601 has a gap from the oblique portion 71A. Thus, it is possible to suppress cooling capacity of the first passage inner wall surface 601, compared to the second passage inner wall surface 602. Furthermore, the second passage inner wall surface 602 is a passage inner wall surface farther from the heating target surface 52a, of the pair of passage inner wall surfaces facing one another in the height direction. In other words, the first passage inner wall surface 601 is a passage inner wall surface closer to the heating target surface 52a, of the pair of passage inner wall surfaces facing one another in the height direction. Thus, in the example depicted in the upper diagram in FIG. 10, it is possible to suppress transmission of heat from the heating target surface 52a to the cooling air CA, and suppress excessive cooling of the first passage inner wall surface 601.

In a case where the oblique portion 71B is disposed so as to stand from the inner wall surface 60a at the inner side in the radial direction Dr toward the outer side in the radial direction Dr as depicted in the lower diagram in FIG. 10, the oblique portion 71B is disposed so as to stand from the first passage inner wall surface 601 closer to the heating target surface 52a toward the second passage inner wall surface 602, of the pair of passage inner wall surfaces (inner wall surfaces 60a) that face one another in the height direction so as to form the cooling passage 60.

In this case, of the section along the flow of the cooling air CA in the cooling passage 60, in the section 64 where the oblique portion 71B is provided, the first passage inner wall surface 601 is connected to the oblique portion 71B, and the second passage inner wall surface 602 has a gap from the oblique portion 71B. Thus, it is possible to enhance cooling capacity of the first passage inner wall surface 601, compared to the second passage inner wall surface 602. Furthermore, the first passage inner wall surface 601 is a passage inner wall surface closer to the heating target surface 52a, of the pair of passage inner wall surfaces facing one another in the height direction. Thus, in the example depicted in the lower diagram in FIG. 10, it is possible to transmit heat from the heating target surface 52a efficiently to the cooling medium, and suppress overheating of the first passage inner wall surface 601.

(When the First Passage Inner Wall Surface 601 is Oblique with Respect to the Heating Target Surface 52a)

In the embodiment depicted in FIGS. 5 to 8, from the upstream side toward the downstream side of the cooling passage 60, the distance 'd' between the first passage inner wall surface 601 and the heating target surface 52a is the same. In contrast, in the embodiment depicted in FIG. 9, of the pair of passage inner wall surfaces facing one another in the height direction so as to form the cooling passage 60, the first passage inner wall surface 601 closer to the heat target surface 52a is oblique with respect to the height direction such that the distance 'd' to the heating target surface 52a reduces from the upstream side toward the downstream side of the cooling passage.

Thus, the distance 'd' between the heating target surface 52a and the first passage inner wall surface 601 reduces from the upstream side toward the downstream side of the cooling passage 60, and thus it is possible to suppress excessive cooling in the upstream section of the cooling passage 60 while preventing shortage of cooling capacity even when the temperature of the cooling air CA increases toward the downstream side in the cooling passage 60.

Figure 11:
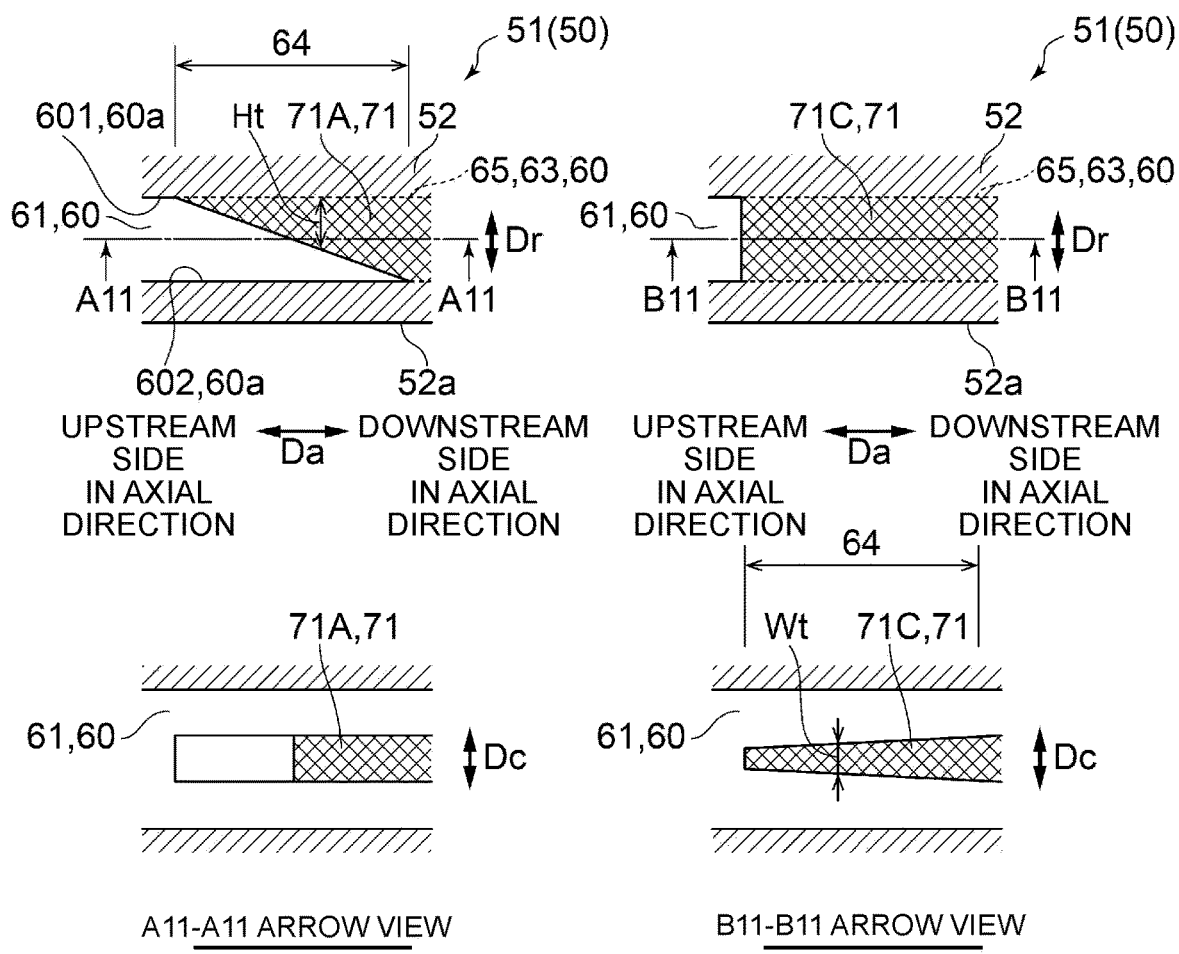
FIG. 11 is a diagram showing two cases: a case in which the height-direction dimension of the oblique portion is gradually increased toward the downstream side, and a case in which the width-direction dimension of the oblique portion is gradually increased toward the downstream side.

FIG. 11 is a diagram showing two cases: a case in which the height-direction dimension of the oblique portion 71 is gradually increased toward the downstream side, and a case in which the width-direction dimension of the oblique portion 71 is gradually increased toward the downstream side. The left diagram in FIG. 11 shows a case in which the dimension of the oblique portion 71A in the height direction is gradually increased toward the downstream side, as depicted in FIGS. 5 to 9. The right diagram in FIG. 11 shows a case in which the dimension in the width direction is gradually increased toward the downstream side.

In a case where the dimension of the oblique portion 71A in the height direction is gradually increased toward the downstream side as in the left diagram of FIG. 11, the oblique portion 71A is formed such that the dimension Ht in the height direction of the cooling passage 60 gradually increases toward the downstream side.

In this case, of the section along the flow of the cooling air CA in the cooling passage 60, in the section where the oblique portion 71A is provided, of the pair of inner wall surfaces 60a (pair of flow passage inner wall surfaces) in the height direction, one of the passage inner wall surfaces (e.g., the second passage inner wall surface 602) is connected to the oblique portion 71A, and the other passage inner wall surface (e.g., first passage inner wall surface 601) has a gap from the oblique portion 71A. Thus, in the section 64 where the oblique portion 71A is provided, the efficiency of cooling by the cooling air CA, that is, the cooling capacity, is different between one passage inner wall surface (e.g., second passage inner wall surface 602) and the other passage inner wall surface (e.g., first passage inner wall surface 601). Thus, in the example shown in the left diagram in FIG. 11, by determining the position of the oblique portion 71 in the segment body 51 taking into account the above difference in the cooling capacity, it is possible to suppress excess or deficiency with respect to the cooling capacity required for the segment body 51.

In a case where the dimension of the oblique portion 71C in the width direction is gradually increased as in the right diagram of FIG. 11, the oblique portion 71C is formed such that the dimension Wt in the width direction gradually increases toward the downstream side.

In this case, of the section along the flow of the cooling air CA in the cooling passage 60, in the section 64 where the oblique portion 71C is provided, both of the pair of inner wall surfaces 60a (pair of passage inner wall surfaces) facing one another in the height direction may be connected to the oblique portion 71C. Thus, in the section 64 where the oblique portion 71C is provided, it is possible to suppress generation of difference in the efficiency of the cooling by the cooling air CA, that is, the cooling capacity, between one passage inner wall surface (e.g., second passage inner wall surface 602) and the other passage inner wall surface (e.g., first passage inner wall surface 601). Accordingly, in the example shown in the right diagram in FIG. 11, for instance, the present embodiment is suitable to a case where the cooling capacity should not preferably be different between one passage inner wall surface and the other passage inner wall surface, like the pressure-side wall surface and the suction-side wall surface of the airfoil portion of the rotor blade 41 or the stator vane 21.

Figure 12:
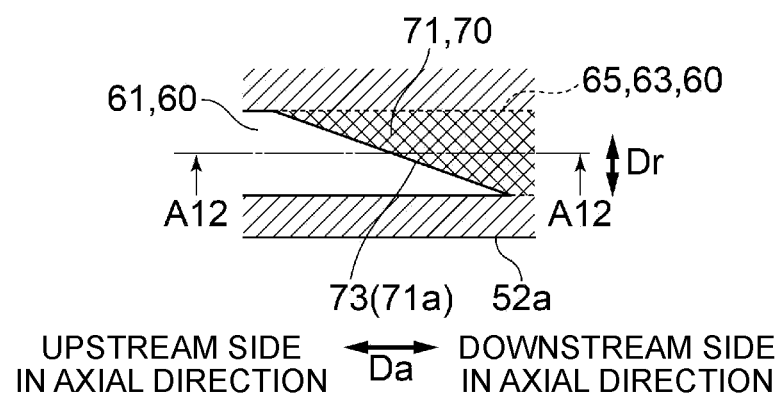
FIG. 12 is a diagram for describing an embodiment of the upstream end portion of the oblique portion.
Figure 12:
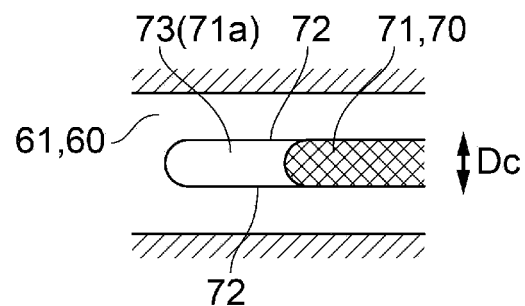

FIG. 12 is a diagram for describing an embodiment of the upstream end portion 73 (tip end portion 71a) of the oblique portion 71 connecting to the side surface 72 of the first partition wall 70 at the oblique portion 71.

In the embodiment depicted in FIG. 12, the upstream end portions 73 of the oblique portion 71 have a chamfered corner. Accordingly, it is possible to suppress pressure loss of the cooling passage 60 in the region where the oblique portion 71 is formed.

Figure 13:
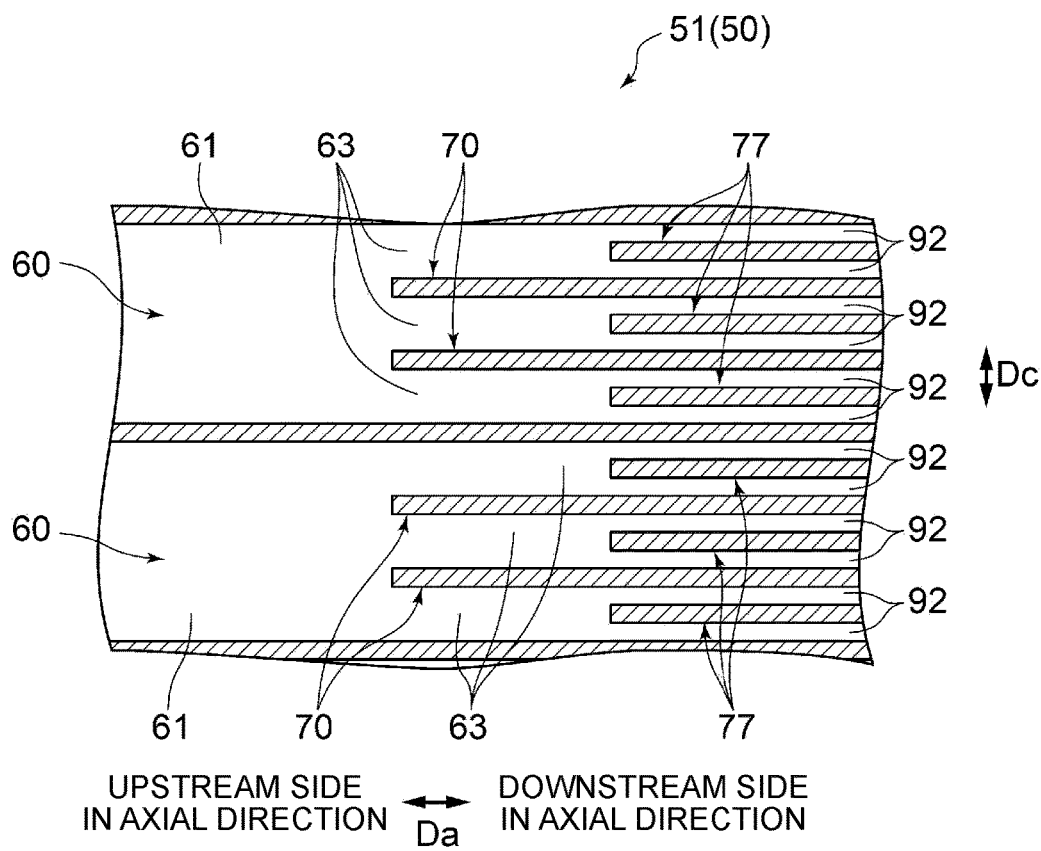
FIG. 13 is a diagram showing a part of a cross-sectional view of a segment body according to yet another embodiment, which corresponds to the cross-sectional view taken along A4-A4 in FIG. 3.

FIG. 13 is a diagram showing a part of a cross-sectional view of a segment body 51 according to yet another embodiment, which corresponds to the cross-sectional view taken along A4-A4 in FIG. 3. The segment body 51 according to an embodiment depicted in FIG. 13 further includes a second partition wall 77 disposed inside the first branch flow passage 63 at the downstream side of the first partition wall 70 so as to partition the first branch flow passage 63 into a plurality of second branch flow passages 92 midway.

Accordingly, it is possible to increase the number of branch stages by partitioning the first branch flow passage 63 into a plurality of second branch flow passages 92 midway, and increase the regulation range of the cooling capacity.

Furthermore, in the embodiment depicted in FIG. 13, a single first branch flow passage 63 is divided into two second branch flow passages 92 midway by the second partition wall 77. Nevertheless, a single first branch flow passage 63 may be divided into three or more second branch flow passages 92. Furthermore, in the embodiment depicted in FIG. 13, a single cooling passage 60 is divided into three first branch flow passages 63 by the first partition wall 70. However, as depicted in FIG. 4 and the like, a single cooling passage may be divided into two first branch flow passages 63 by the first partition wall 70 and then each of the two first branch flow passages 63 may be divided into two branch flow passages 92 midway by the second partition wall 77, or into three or more second branch flow passages 92.

(Method of Producing the Segment Body 51)

Figure 14:
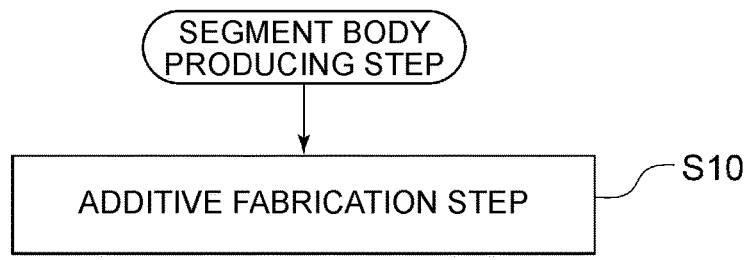
FIG. 14 is a flow chart showing an example of the producing process of producing a segment body by metal additive fabrication according to some embodiments.

The segment body 51 according to some embodiments can be produced by metal additive fabrication or precision casting, for instance. FIG. 14 is a flow chart showing an example of the producing process for producing a segment body 51 by metal additive fabrication according to some embodiments. The method of producing the segment body 51 according to some embodiments includes the additive fabrication step S10. The additive fabrication step S10 includes a step of, by metal additive fabrication, forming the plurality of cooling passages 60 through which the cooling air CA is able to flow inside the segment body 51, and forming the first partition wall 70 disposed inside each of the cooling passages 60 to partition the cooling passage 60 into the plurality of first branch flow passages 63.

In the additive fabrication step S10, the first partition wall 70 is formed to include the oblique portion 71 formed such that, in an upstream side region 70a of the first partition wall 70, a flow-passage cross-sectional area of the cooling passage as seen in the extension direction of the cooling passage gradually decreases from the upstream side toward the downstream side.

In the additive fabrication step S10, for instance, a material powder is laminated from the upstream side in the axial direction Da toward the downstream side in the axial direction Da to form the segment body 51. In the additive fabrication step S10, the method of forming the segment body 51 may be, for instance, the powder bed method, the metal deposition method, the binder jetting method, or any other method other than the above.

By forming the segment body 51 according to some embodiments by metal additive fabrication, it is possible to form the segment body 51 having a complex cooling structure therein relatively easily.

Furthermore, by forming the segment body 51 according to some embodiments by metal additive fabrication, it is possible provide a segment body 51 which is configured to suppress excessive cooling in the section 61 at the upstream side of the first branch flow passages 63, while preventing shortage of cooling capacity even when the temperature of the cooling air CA increases toward the downstream side in the first branch flow passages 63.

Embodiments of the present invention were described in detail above, but the present invention is not limited thereto, and various amendments and modifications may be implemented.

Figure 15:
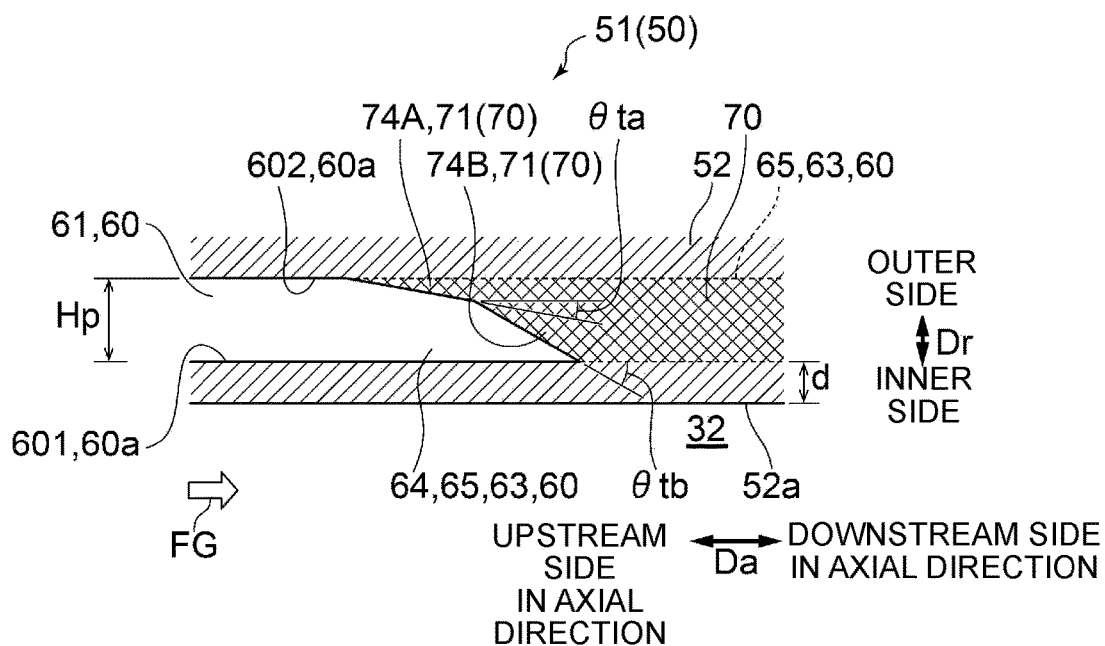
FIG. 15 is a diagram showing a modified example of the oblique portion.

For instance, in the above described embodiments, the obliquity angle θt of the oblique portion 71 may be constant from the upstream end to the downstream end of the oblique portion 71, or may change midway between the upstream end and the downstream end of the oblique portion 71, as depicted in FIG. 15. FIG. 15 is a cross-sectional view corresponding to an enlarged cross-sectional view of the area around the upstream end portion of the first partition wall 70 in FIG. 5, showing a modified example of the oblique portion 71. Furthermore, in the modified example depicted in FIG. 15, the obliquity angle θta of the upstream side oblique portion 74A of the oblique portion 71 is smaller than the obliquity angle θtb of the downstream side oblique portion 74B of the oblique portion 71. Nevertheless, the obliquity angle θta may be larger than the obliquity angle θtb of the downstream side oblique portion 74B. Furthermore, the obliquity angle θt of the oblique portion 71 may change twice or more times between the upstream end and the downstream end of the oblique portion 71. Furthermore, the obliquity angle θt of the oblique portion 71 may change continuously between the upstream end and the downstream end of the oblique portion 71. That is, the oblique portion 71 may be formed such that the tip end portion 71a has an arc shape as seen in the circumferential direction Dc.

Figure 16:
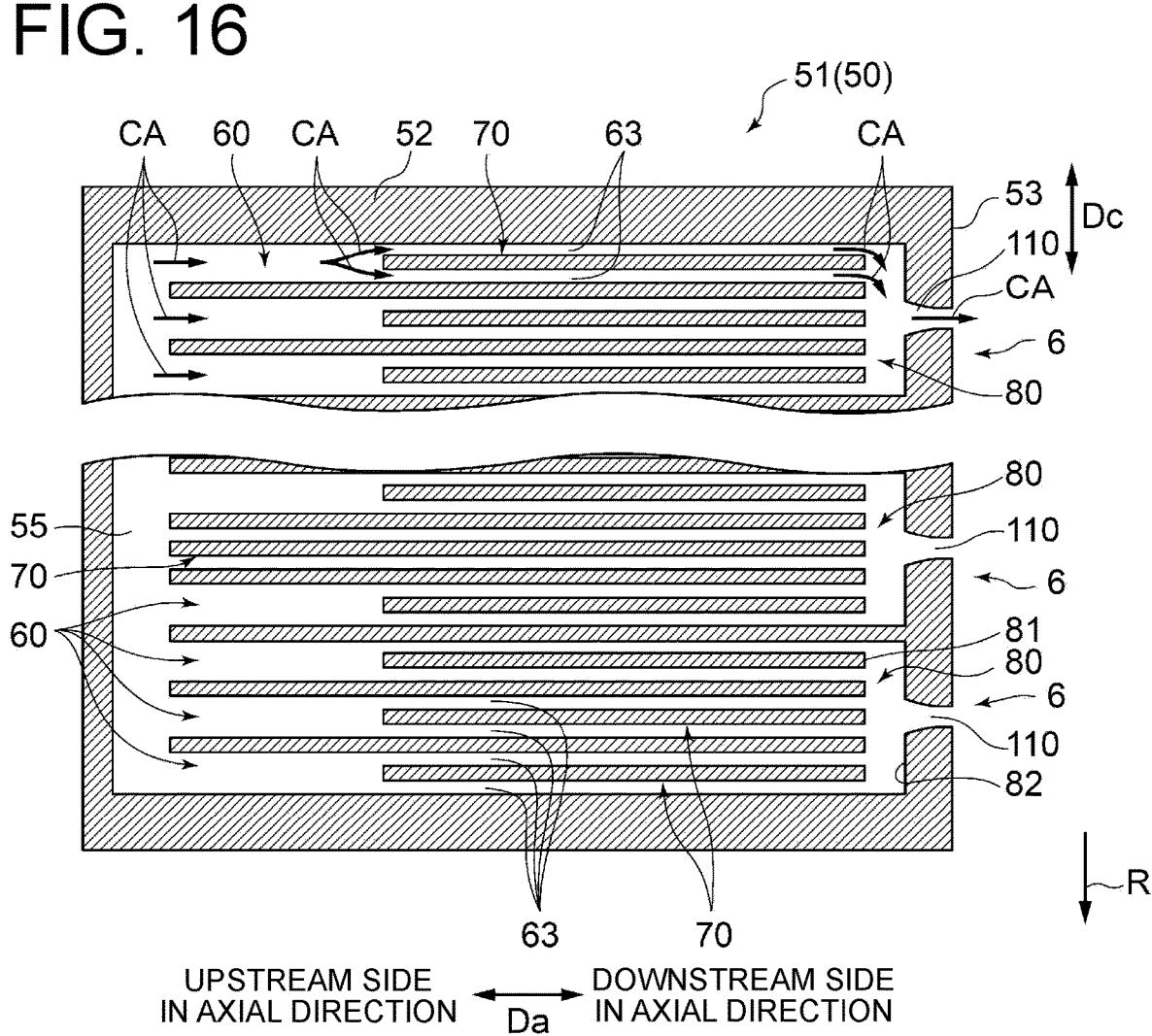
FIG. 16 is a diagram showing a modified example of the first partition wall.

For instance, in some embodiments described above, the first partition wall 70 partitions the cooling passage 60 midway into a plurality of first branch flow passages 63. However, as depicted in FIG. 16, the first partition wall 70 may partition the cooling passage 60 into a plurality of first branch flow passages 63 from the upstream end of the cooling passage 60. That is, the position of the upstream end of the oblique portion 71 may be the same as the position of the upstream end of the cooling passage 60. FIG. 16 is a cross-sectional diagram corresponding to the A4-A4 arrow cross-sectional view in FIG. 3, showing a modified example of the first partition wall 70. In FIG. 16, the position of the upstream end of the first partition wall 70 is changed for only one of the cooling passages 60. Nevertheless, the position of the upstream end may be changed for more than one of the first partition walls 70.

In the above described embodiments, for instance the ring segment 50 is described as an example of a high-temperature component that requires to be cooled by a cooling medium. Nevertheless, the present invention is not limited to this, and can be applied to other high-temperature components, such as the combustor 12, the rotor blade 41, the stator vane 21, the inner shroud 25, and the outer shroud 27. Furthermore, application of the present invention is not limited to constituent components of the gas turbine 10. The present invention can be applied to constituent components of various machines that use a high-temperature medium, such as a boiler and a rocket engine.

REFERENCE SIGN LIST

6 Cooling passage group
10 Gas turbine
12 Combustor
13 Turbine
21 Turbine stator vane (stator vane)
41 Turbine rotor blade (rotor blade)
50 Ring segment
51 Segment body
52 Body
52b Outer surface (heating target surface)
60 Axial-direction passage (cooling passage)
63 First branch flow passage
63b Tapered wall surface
68 Upstream end region
68a Height gradual increase region
70 First partition wall
71, 71A, 71B, 71C Oblique portion
73 Upstream end portion
77 Second partition wall
80 Header portion
92 Second branch flow passage

The invention claimed is:

1. A high-temperature component cooled by a cooling medium, the high-temperature component comprising:
a plurality of cooling passages through which the cooling medium is able to flow; and
a first partition wall disposed inside each of the cooling passages to partition the each cooling passage into a plurality of first branch flow passages,
wherein each cooling passage includes, in an extending direction of the cooling passage, a first section in which the first partition wall is provided and a second section in which the first partition wall is not provided, the second section being upstream of the first branch flow passages, and
wherein for each cooling passage, the first partition wall includes an oblique portion formed such that, in an upstream side region of the first partition wall, a flow-passage cross-sectional area of the cooling passage as seen in the extending direction of the cooling passage gradually decreases from an upstream side toward a downstream side.

2. The high-temperature component according to claim 1, wherein each of the cooling passages is divided into a pair of the first branch flow passages by the first partition wall in a width direction of the each cooling passage, and
wherein each of the first branch flow passages is formed such that, in an upstream end region of the first branch flow passage adjacent to the oblique portion of the first partition wall in the width direction, a dimension Hp of each cooling passage in a height direction orthogonal to the width direction gradually increases toward the downstream side.

3. The high-temperature component according to claim 1, wherein each of the cooling passages is divided into a pair of the first branch flow passages by the first partition wall in a width direction of each cooling passage, and
wherein each of the first branch flow passages includes, at least at a downstream side of the oblique portion, a flow-passage height reduction portion where a dimension Hp of each cooling passage in a height direction orthogonal to the width direction gradually decreases toward the downstream side.

4. The high-temperature component according to claim 3, wherein the flow-passage height reduction portion and the oblique portion overlap with one another at least partially in the extension direction of each cooling passage.

5. The high-temperature component according to claim 3, wherein an inner wall surface of each first branch flow passage forming the flow-passage height reduction portion includes a tapered wall surface which is oblique with respect to the extension direction of each cooling passage, and
wherein an obliquity angle of the oblique portion with respect to the extension direction of each cooling passage is greater than an obliquity angle of the tapered wall surface with respect to the extension direction.

6. The high-temperature component according to claim 1, wherein each of the cooling passages is partitioned into a pair of the first branch flow passages by the first partition wall in a width direction of each cooling passage, and
wherein the oblique portion is formed such that a dimension Ht in a height direction of each cooling passage orthogonal to the width direction gradually increases toward the downstream side.

7. The high-temperature component according to claim 6, further comprising a heating target surface at one side of each cooling passage in the height direction,
wherein each cooling passage includes first and second passage inner wall surfaces which face one another in the height direction, and the oblique portion is formed so as to project from the first passage inner wall surface toward the second passage inner wall surface, the first passage inner wall surface being closest to the heating target surface of the high-temperature component among the first and second passage inner wall surfaces.

8. The high-temperature component according to claim 6, further comprising a heating target surface at one side of each cooling passage in the height direction,
wherein each cooling passage includes first and second passage inner wall surfaces which face one another in the height direction, and the oblique portion is formed so as to project from the second passage inner wall surface toward the first passage inner wall surface, the second passage inner wall surface being farthest from the heating target surface of the high-temperature component among the first and second passage inner wall surfaces.

9. The high-temperature component according to claim 6, wherein the oblique portion has an obliquity angle of not greater than 45 angular degrees with respect to the extension direction of each cooling passage.

10. The high-temperature component according to claim 1,
wherein each of the cooling passages is partitioned into a pair of the first branch flow passages by the first partition wall in a width direction of each cooling passage, and
wherein the oblique portion is formed such that a dimension Wt in the width direction gradually increases toward the downstream side.

11. The high-temperature component according to claim 1,
further comprising a second partition wall disposed in the first branch flow passage at a downstream side of the first partition wall to partition the first branch flow passage into a plurality of second branch flow passages midway.

12. The high-temperature component according to claim 1,
wherein an upstream end portion of the oblique portion connecting to a side surface of the first partition wall at the oblique portion has a chamfered corner.

13. The high-temperature component according to claim 1,
further comprising a heating target surface at one side in a height direction of each cooling passage,
wherein each cooling passage includes first and second passage inner wall surfaces which face one another in the height direction, the first passage inner wall surface is closest to the heating target surface among the first and second passage inner wall surfaces, and the first passage inner wall surface is oblique with respect to the heating target surface such that a distance to the heating target surface reduces from the upstream side toward the downstream side of the cooling passage.

14. The high-temperature component according to claim 1, wherein the plurality of cooling passages includes two cooling passages that extend along one direction and are adjacent to each other, and wherein each of the two cooling passages is configured such that the cooling medium flows from one end to an opposite end in the one direction.

15. A method of producing a high-temperature component which requires cooling by a cooling medium, wherein the high-temperature component comprises:
- a plurality of cooling passages through which the cooling medium is able to flow; and
- a first partition wall disposed inside each of the cooling passages to partition each cooling passage into a plurality of first branch flow passages,
- wherein each cooling passage includes, in an extending direction of the cooling passage, a first section in which the first partition wall is provided and a second section in which the first partition wall is not provided, the second section being upstream of the first branch flow passages, and
- wherein for each cooling passage, the first partition wall includes an oblique portion formed such that, in an upstream side region of the first partition wall, a flow-passage cross-sectional area of the cooling passage as seen in the extending direction of the cooling passage gradually decreases from an upstream side toward a downstream side, the method comprising:
forming, by metal additive fabrication, the plurality of cooling passages through which the cooling medium is able to flow inside the high-temperature component, and forming the first partition wall disposed inside each of the cooling passages to partition each cooling passage into the plurality of first branch flow passages.

* * * * *